(12) United States Patent
Taylor et al.

(10) Patent No.: US 11,449,084 B1
(45) Date of Patent: Sep. 20, 2022

(54) DEVICE FOR ASSESSING AND MANAGING A HEALTH IMPACT OF AN INDOOR ENVIRONMENT AT A SITE LOCATION

(71) Applicant: Building4Health Inc., Keswick, VA (US)

(72) Inventors: Stephanie Hughes Taylor, Stowe, VT (US); Michael Bennett Solovay, New York, NY (US); Peter Railey Taylor, Sr., Keswick, VA (US)

(73) Assignee: Building4Health Inc., Keswick, VA (US)

( * ) Notice: Subject to any disclaimer, the term of this patent is extended or adjusted under 35 U.S.C. 154(b) by 0 days.

(21) Appl. No.: 17/482,197

(22) Filed: Sep. 22, 2021

(51) Int. Cl.
   G05D 27/02 (2006.01)
   G05D 22/02 (2006.01)
   G06N 20/00 (2019.01)
   G08B 21/18 (2006.01)
   G05D 23/19 (2006.01)

(52) U.S. Cl.
   CPC ............. G05D 27/02 (2013.01); G05D 22/02 (2013.01); G05D 23/1928 (2013.01); G06N 20/00 (2019.01); G08B 21/182 (2013.01)

(58) Field of Classification Search
   CPC combination set(s) only.
   See application file for complete search history.

(56) References Cited

U.S. PATENT DOCUMENTS

| | | | | |
|---|---|---|---|---|
| 6,427,461 B1* | 8/2002 | Whinery | ................. | F24F 3/153 62/176.6 |
| 10,572,956 B1* | 2/2020 | Wilbrecht | ............ | G05B 19/048 |
| 2006/0234621 A1* | 10/2006 | Desrochers | ............. | F24F 3/044 454/239 |
| 2013/0260668 A1* | 10/2013 | Stakutis | ................... | F24F 11/30 454/256 |

(Continued)

OTHER PUBLICATIONS

J. Saini, M. Dutta and G. Marques, "Indoor Air Quality Monitoring with IoT: Predicting PM10 for Enhanced Decision Support," 2020 International Conference on Decision Aid Sciences and Application (DASA), 2020, pp. 504-508, doi: 10.1109/DASA51403.2020. 9317054. (Year: 2020).*

(Continued)

*Primary Examiner* — James D. Rutten
(74) *Attorney, Agent, or Firm* — Greenberg Traurig, LLP

(57) ABSTRACT

A system and a method include receiving, by a processor, from environmental sensors, environmental output data measurements. The environmental sensors are located at a site location. An health impact scoring algorithm computes a plurality of health impact scores from the environmental output data measurements. An overall health impact score at the site location is computed from the any of the health impact scores having a lowest value. A machine learning model generates at least one recommendation for remediating at least one verified environmental hazard type. At least one of the overall health impact score, the at least one verified environmental hazard type, or the at least one recommendation are displayed on a computing device. An (Continued)

instruction is sent to environment-controlling equipment located at the site location to change an operational parameter of the environment-controlling equipment to mitigate the at least one verified environmental hazard type.

24 Claims, 9 Drawing Sheets

(56) References Cited

U.S. PATENT DOCUMENTS

| | | | |
|---|---|---|---|
| 2013/0331993 A1* | 12/2013 | Detsch | A47B 9/12 700/275 |
| 2014/0260692 A1* | 9/2014 | Sharp | G01N 1/2273 73/863.23 |
| 2016/0034838 A1* | 2/2016 | Gembicki | G06Q 10/06393 705/7.39 |
| 2016/0314256 A1* | 10/2016 | Su | G16H 50/50 |
| 2017/0286622 A1* | 10/2017 | Cox | G06N 5/025 |
| 2017/0299210 A1* | 10/2017 | Nyamjav | H04L 12/282 |
| 2017/0372216 A1* | 12/2017 | Awiszus | G02F 1/13318 |
| 2017/0372242 A1* | 12/2017 | Alsubai | G06Q 10/0635 |
| 2018/0165854 A1* | 6/2018 | Du | G06N 20/00 |
| 2020/0028703 A1* | 1/2020 | Homsi | G06N 3/08 |
| 2020/0167682 A1* | 5/2020 | Watson | G06N 20/00 |
| 2020/0279653 A1* | 9/2020 | Hayward | G06Q 10/00 |
| 2020/0378641 A1* | 12/2020 | Uriarte | F24F 11/80 |
| 2020/0394886 A1* | 12/2020 | Antar | G01N 33/0063 |
| 2022/0058556 A1* | 2/2022 | Warake | G06Q 10/0639 |

OTHER PUBLICATIONS

C. R. K, N. R. K, B. P. K and P. S. Rajendran, "The Prediction of Quality of the Air Using Supervised Learning," 2021 6th International Conference on Communication and Electronics Systems (ICCES), 2021, pp. 1-5, doi: 10.1109/ICCES51350.2021.9488983. (Year: 2021).*

J. Rantas et al., "A User Interface Informing Medical Staff on Continuous Indoor Environmental Quality to Support Patient Care and Airborne Disease Mitigation," 2021 Systems and Information Engineering Design Symposium (SIEDS), 2021, pp. 1-6, doi: 10.1109/SIEDS52267.2021.9483774. (Year: 2021).*

Air Data Basic Information; United States Environmental Protection Agency; pp. 1-12, last updated May 26, 2021, retrieved Sep. 22, 2021 <<https://www.epa.gov/outdoor-air-quality-data/air-data-basic-information>>.

* cited by examiner

O₃ (ppm) - Ozone — 410

| BPLO | BPHI |
|---|---|
| 0 | 0.040 |
| 0.041 | 0.104 |
| 0.105 | 0.124 |
| 0.125 | 0.374 |
| 0.375 | 0.504 |
| 0.505 | 0.604 |

PM₁₀ (mg/m3) — 435

| BPLO | BPHI |
|---|---|
| 0.07 | 0.13 |
| 0.14 | 0.25 |
| 0.26 | 0.1 |
| 0.11 | 0.14 |
| 0.15 | 0.24 |
| >0.25 | |

PM₂.₅ (ug/m3) — 415

| BPLO | BPHI |
|---|---|
| 0 | 15.4 |
| 15.5 | 65.4 |
| 65.5 | 150.4 |
| 150.5 | 250.4 |
| 250.5 | 350.4 |
| 350.5 | 500.4 |

PM₁₀ (ug/m3) — 425

| BPLO | BPHI |
|---|---|
| 0 | 54 |
| 55 | 254 |
| 255 | 354 |
| 355 | 424 |
| 425 | 504 |
| 505 | 604 |

CO (ppm) — 430

| BPLO | BPHI |
|---|---|
| 0 | 1.7 |
| 1.8 | 8.7 |
| 8.8 | 10 |
| 10.1 | 50 |
| 30.5 | 40.4 |
| 40.5 | 50.4 |

CO₂ (ppm) — 420

| BPLO | BPHI |
|---|---|
| 340 | 600 |
| 601 | 1000 |
| 1001 | 1500 |
| 1501 | 2000 |
| 2001 | 5000 |
| >5000 | | total VOCs (ppm) — 440

| BPLO | BPHI |
|---|---|
| 0 | 0.087 |
| 0.088 | 0.261 |
| 0.262 | 0.43 |
| 0.44 | 3.00 |
| >3.00 | >3.00 |

SO₂ (ppm) — 445

| BPLO | BPHI |
|---|---|
| 0 | 0.034 |
| 0.035 | 0.224 |
| 0.225 | 0.304 |
| 0.305 | 0.604 |
| 0.605 | 0.804 |
| 0.805 | 1.004 |

NO₂ (ppm) — 450

| BPLO | BPHI |
|---|---|
| none | none |
| none | |
| 0.65 | 1.24 |
| 1.25 | 1.64 |
| 1.65 | 2.04 |

FIG. 6

| Measured Compound (i) | HI(i) | HI(i) Unweighted Formula | Weighting limits of secondary elements (g) on measured compound |  |  |  |  |  |  |  |  |  |
|---|---|---|---|---|---|---|---|---|---|---|---|---|---|
|  |  |  | Ozone | CO | $PM_{1.0}$ | $PM_{2.5}$ | $PM_{10.0}$ | $NO_2$ | $SO_2$ | $CO_2$ | Temp | RH |
| Ozone | HI(Ozone)= | $1721.7(C_{O3})^2 - 947.43(C_{O3}) + 129.07$ | N/A |  |  |  |  |  |  |  |  | 20% |
| CO | HI(CO)= | $0.044(C_{CO})^2 - 4.4698(C_{CO}) + 114.8$ |  | N/A |  |  |  |  |  |  |  | 10% |
| $PM_{1.0}$ | HI($PM_{1.0}$)= | N/A |  |  | N/A |  |  |  |  |  |  | 25% |
| $PM_{2.5}$ | HI($PM_{2.5}$)= | $0.0001(C_{PM2.5})^2 - 0.2075(C_{PM2.5}) + 101.53$ |  |  |  | N/A |  |  |  |  |  | 30% |
| $PM_{10.0}$ | HI($PM_{10.0}$)= | $-0.0001(C_{PM10.0})^2 - 0.2056(C_{PM10.0}) + 110.79$ |  |  |  |  | N/A |  |  |  |  | 5% |
| $NO_2$ | HI($NO_2$)= | $-12.775(C_{NO2})^2 - 19.837(C_{NO2}) + 93.172$ |  |  |  |  |  | N/A |  |  |  | 10% |
| $SO_2$ | HI($SO_2$)= | $0.334(C_{SO2})^2 - 12.569(C_{SO2}) + 114.37$ |  |  |  |  |  |  | N/A |  |  | 10% |
| $CO_2$ | HI($CO_2$)= | $2E-06(C_{CO2})^2 - 0.034(C_{CO2}) + 110.1$ |  |  |  |  |  |  |  | N/A |  | 0% |
| Temperature | HI(Temp)= | N/A |  |  |  |  |  |  |  |  | N/A | 0% |
| Relative Humidity | HI(RH)= | N/A |  |  |  |  |  |  |  |  |  | N/A |

Multi-aggregate weighting:
Weighted HI(i) = HI(i) × (1 - W(i)+(W×H(g)/100)) = HI(ozone) × (1 - W_ozone)+(W_ozone × H(g)/100))

FIG. 7

DEVICE FOR ASSESSING AND MANAGING A HEALTH IMPACT OF AN INDOOR ENVIRONMENT AT A SITE LOCATION

FIELD OF TECHNOLOGY

The present disclosure generally relates to a device for assessing and managing the health impact of an indoor environment at a site location.

BACKGROUND OF TECHNOLOGY

A computer network platform/system may include a group of computers (e.g., clients, servers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of receiving, by a processor, over a communication network, from a plurality of environmental sensors, a plurality of environmental output data measurements of a plurality of environmental parameters. The plurality of environmental sensors is located inside of at least one site location, outside of the at least one site location, or both. The plurality of environmental sensors comprises:
 (i) an ozone sensor, outputting an ozone output data measurement of the plurality of environmental output data measurements,
 (ii) a humidity sensor, outputting a humidity output data measurement of the plurality of environmental output data measurements,
 (iii) a temperature sensor, outputting a temperature output data measurement of the plurality of environmental output data measurements,
 (iv) a carbon dioxide sensor, outputting a carbon dioxide output data measurement of the plurality of environmental output data measurements,
 (v) a carbon monoxide sensor, outputting a carbon monoxide output data measurement of the plurality of environmental output data measurements,
 (vi) a nitrous dioxide sensor, outputting a nitrous dioxide output data measurement of the plurality of environmental output data measurements,
 (vii) a sulfur dioxide sensor, outputting a sulfur dioxide output data measurement of the plurality of environmental output data measurements,
 (viii) a total volatile organic compound (tVOC) sensor, outputting a tVOC output data measurement of the plurality of environmental output data measurements, and
 (ix) at least one particulate matter sensor, outputting at least one particulate matter output data measurement of the plurality of environmental output data measurements;

A health impact scoring algorithm may be executed, by the processor, to compute a plurality of health impact scores based at least in part on the plurality of environmental output data measurements from the plurality of environmental sensors. A humidity health impact score of the plurality of health impact scores may be based at least in part on the humidity output data measurement. An ozone health impact score of the plurality of health impact scores may be based at least in part on the ozone output data measurement. A temperature health impact score of the plurality of health impact scores may be based at least in part on the temperature output data measurement. A carbon dioxide health impact score of the plurality of health impact scores may be based at least in part on the carbon dioxide output data measurement. A carbon monoxide health impact score of the plurality of health impact scores may be based at least in part on the carbon monoxide output data measurement. A nitrous dioxide health impact score of the plurality of health impact scores may be based at least in part on the nitrous dioxide output data measurement. A sulfur dioxide health impact score of the plurality of health impact scores may be based at least in part on the sulfur dioxide output data measurement. A tVOC health impact score of the plurality of health impact scores may be based at least in part on the tVOC output data measurement. At least one particulate matter health impact score of the plurality of health impact scores may be based at least in part on the at least particulate matter output data measurement. An overall health impact score in the at least one site location may be computed by the processor based at least in part on any of the plurality of health impact scores having a lowest health impact score. At least one verified environmental hazard type in the at least one site location may be determined by the processor when at least one particular health impact score of the plurality of health impact scores is less than a respective predefined threshold score that is unique to the at least one particular environmental parameter. At least one machine learning model, may generate by the processor at least one recommendation for remediating the at least one verified environmental hazard type when inputting the plurality of health impact scores into the at least one machine recommendation learning model. At least one of may be transmitted by the processor:
 (A) at least one first instruction to display on a computing device at least one of:
  (i) the overall health impact score,
  (ii) the at least one verified environmental hazard type, or
  (iii) the at least one recommendation, or
 (B) at least one second instruction to at least one environment-controlling equipment located at the at least one site location so as to change an operational parameter of the at least one environment-controlling equipment to mitigate the at least one verified environmental hazard type.

In some embodiments, the present disclosure provides an exemplary technically improved computer-based system that includes at least the following components a memory and a processor. The processor may be configured to execute computer code stored in the memory that causes the processor to receive over a communication network, from a plurality of environmental sensors, a plurality of environmental output data measurements of a plurality of environmental parameters, where the plurality of environmental sensors may located inside of at least one site location, outside of the at least one site location, or both, wherein the plurality of environmental sensors may include:
 (i) an ozone sensor, outputting an ozone output data measurement of the plurality of environmental output data measurements,
 (ii) a humidity sensor, outputting a humidity output data measurement of the plurality of environmental output data measurements, (iii) a temperature sensor, outputting a temperature output data measurement of the plurality of environmental output data measurements, (iv) a carbon dioxide sensor, outputting a carbon dioxide output data measurement of the plurality of environmental output data measurements, (v) a carbon monoxide sensor, outputting a carbon monoxide output data measurement of the plurality of environmental output data measurements, (vi) a nitrous dioxide sensor, outputting a nitrous dioxide output data measurement of the plurality of environmental output data measurements, (vii) a sulfur dioxide sensor, outputting a sulfur dioxide output data measurement of the plurality of environmental output data measurements, (viii) a total volatile organic compound (tVOC) sensor, outputting a tVOC output data measurement of the plurality of environmental output data measurements, and (ix) at least one particulate matter sensor, outputting at least one particulate matter output data measurement of the plurality of environmental output data measurements, to execute a health impact scoring algorithm to compute a plurality of health impact scores based at least in part on the plurality of environmental output data measurements from the plurality of environmental sensors, where a humidity health impact score of the plurality of health impact scores may be based at least in part on the humidity output data measurement, where an ozone health impact score of the plurality of health impact scores may be based at least in part on the ozone output data measurement, where a temperature health impact score of the plurality of health impact scores may be based at least in part on the temperature output data measurement, where a carbon dioxide health impact score of the plurality of health impact scores may be based at least in part on the carbon dioxide output data measurement, where a carbon monoxide health impact score of the plurality of health impact scores may be based at least in part on the carbon monoxide output data measurement, where a nitrous dioxide health impact score of the plurality of health impact scores may be based at least in part on the nitrous dioxide output data measurement, where a sulfur dioxide health impact score of the plurality of health impact scores may be based at least in part on the sulfur dioxide output data measurement, where a tVOC health impact score of the plurality of health impact scores may be based at least in part on the tVOC output data measurement, where at least one particulate matter health impact score of the plurality of health impact scores may be based at least in part on the at least one particulate matter output data measurement, to compute an overall health impact score in the at least one site location based at least in part on any of the plurality of health impact scores having a lowest health impact score, to determine at least one verified environmental hazard type in the at least one site location when at least one particular health impact score of the plurality of health impact scores is less than a respective predefined threshold score that is unique to the at least one particular environmental parameter, to generate by at least one machine learning model, at least one recommendation for remediating the at least one verified environmental hazard type when inputting the plurality of health impact scores into the at least one machine learning model, and to transmit over the communication network, at least one of:

(A) at least one first instruction to display on a computing device at least one of:

(i) the overall health impact score, (ii) the at least one verified environmental hazard type, or (iii) the at least one recommendation, or (B) at least one second instruction to at least one environment-controlling equipment located at the at least one site location so as to change an operational parameter of the at least one environment-controlling equipment to mitigate the at least one verified environmental hazard type.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 6 is a table showing the breakpoint values for different pollutants in accordance with one or more embodiments of the present disclosure;

FIG. 7 is a table showing a second embodiment for computing health index scores in accordance with one or more embodiments of the present disclosure;

DETAILED DESCRIPTION

Figure 1:
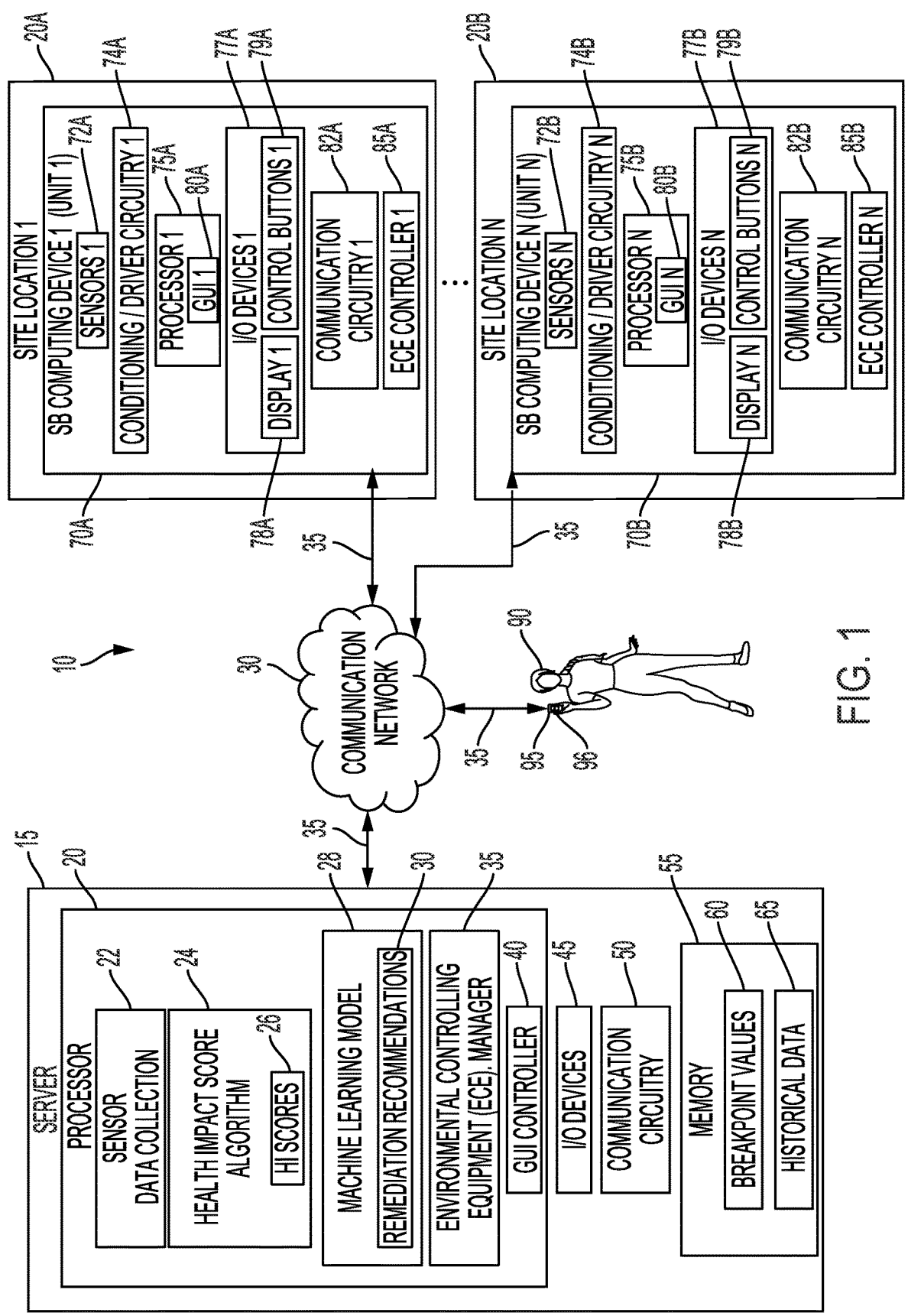
FIG. 1 is a diagram of a system for assessing and managing a health impact of an indoor environment at a site location in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure describe system using a device for assessing and managing a health impact of an indoor environment at a site location. The indoor environment at the site location in which at least one person occupies may have an impact on the health of the at least one person. The computer-based systems and methods disclosed herein may optimize a plurality of environmental factors at the site location so as to ensure safe and healthy indoor environments for its occupants. For example, the system and methods described herein may be used to optimize indoor environments. The optimized indoor environments may not only reduce the probability of infectious aerosol transmission, but may also promote a robust immune system and mitigate health problems, such as for example, fatigue, decreased cognitive functioning, stress, anxiety and depression, allergies and autoimmune disorders, dermatitis, bronchospasm and reactive airway disease (asthma), respiratory inflammation, eye irritation and excessive tearing.

The term site location may refer to at least one room or indoor environment in a house, building, and/or buildings at one or more locations that may be monitored by a central monitoring facility, as well as the outdoor area proximal to the at least one room or indoor environment at the site location.

FIG. 1 is a diagram of a system 10 for assessing and managing a health impact of an indoor environment at a site location in accordance with one or more embodiments of the present disclosure. The system 10 may include a server 15, a plurality of N sensor-based (SB) computing devices 70A and 70B denoted UNIT 1 and UNIT N, where N is an integer at a respective plurality of N site locations 20A and 20B, and a mobile computing device 95 with a graphic user interface (GUI) 96 on a display associated with a user 90 that all communicate 35 over a communication network 30. The mobile computing device associated with the user may also be a computer, tablet, laptop, for example with a GUI 96. Note that FIG. 1 illustrates, merely for conceptual clarity and not by way of limitation, one sensor-based computing device at one site location, but there may be any suitable number of sensor-based computing devices at a single site location.

In some embodiments, the server 15 may include a processor 20, a memory 55, input and output (I/O) devices 45 and a communication circuitry 50 for enabling the server 15 to communicate 35 over the communication network 30. The processor 20 may execute software modules to enable the functions of the system 10 as described herein. The software modules may include a sensor data collection 22 module for collecting sensor data from each of the N sensor-based computing devices over the communication network 30, a health impact score algorithm 24 for computing health impact (HI) scores 26 for the collected sensor data, a machine learning model 28 trained to output remediation recommendations 30, an environmental controlling equipment (ECE) manager 35 for sending instructions over the communication network for controlling environment controlling equipment at the site location, and a GUI controller 40 for sending instructions to display, for example, health impact scores, remediation recommendations, and/or any other suitable metrics on any of the graphic user interfaces (GUIs) used in the system 10. The memory 55 may store a breakpoint value 60 database, where the breakpoint values may be used to compute the health impact scores and/or a historical data 65 database may be used to store any suitable parameters needed to display to a user, the historical health impact scores over any desired time interval. The memory 55 may store any suitable database for storing data for performing the functions described herein.

In some embodiments, at the site location 1 20A, a sensor-based (SB) computing device1 70A may be located. The SB computing device1 70A may include a plurality of sensors 72A denoted SENSORS 1, conditioning and sensor data driver circuitry 1 74A for conditioning the sensor data by converting the analog output data from the sensors to digital sensor data via analog-to-digital converters, input and output (I/O) devices1 77A, such as a display1 78A, a microphone and/or speaker (not shown), and/or control buttons 1 79A, for example, a processor1 75A that may be configured to display a GUI 1 80A on the display 1 78A, a communication circuitry 1 82A for enabling the SB computing device to communicate 35 over the communication network 30, and/or an environmental controlling equipment controller 1 85A circuitry for controlling equipment at the site location for optimizing the environment in which the SB computing device1 82A is located. The circuitry of the SB computing device1 70A may be powered by a battery, a solar cell, and/or via a connection a mains electricity such as via a wall outlet, for example. The control buttons 1 79A may be used for powering UNIT1 on and off, changing any readouts on the display1 78A, or used for any suitable purpose.

In some embodiments, similarly at the Nth site location 20B, a sensor-based (SB) computing deviceN 70B may be located. The SB computing deviceN 70B may include a plurality of sensors 72B denoted SENSORS N, conditioning and sensor data driver circuitry N 74B for conditioning the sensor data by converting the analog output data from the sensors to digital sensor data via analog-to-digital converters, input and output (I/O) devicesN 77B, such as a displayN 78B, a microphone and/or speaker (not shown), and/or control buttons N 79B, for example, a processorN 75B that may be configured to display a GUI N 80B on the display N 78B, a communication circuitry N 82B for enabling the SB computing device to communicate 35 over the communication network 30, and/or an environmental controlling equipment controller N 85B circuitry for controlling equipment at the site location for optimizing the environment in which the SB computing device N 70B is located. The circuitry of the SB computing deviceN 70B may be powered by a battery, a solar cell, and/or via a connection a mains electricity such as via a wall outlet, for example. The control buttons N 79B may be used for powering UNITN on and off, changing any readouts on the displayN 78B, or used for any suitable purpose.

It should be noted that the Nth SB computing deviceN 70B and its elements may be referred to hereinafter as SB computing device 70 at the site location 20, the processor 75 controlling a GUI 80, etc.

Figure 2:
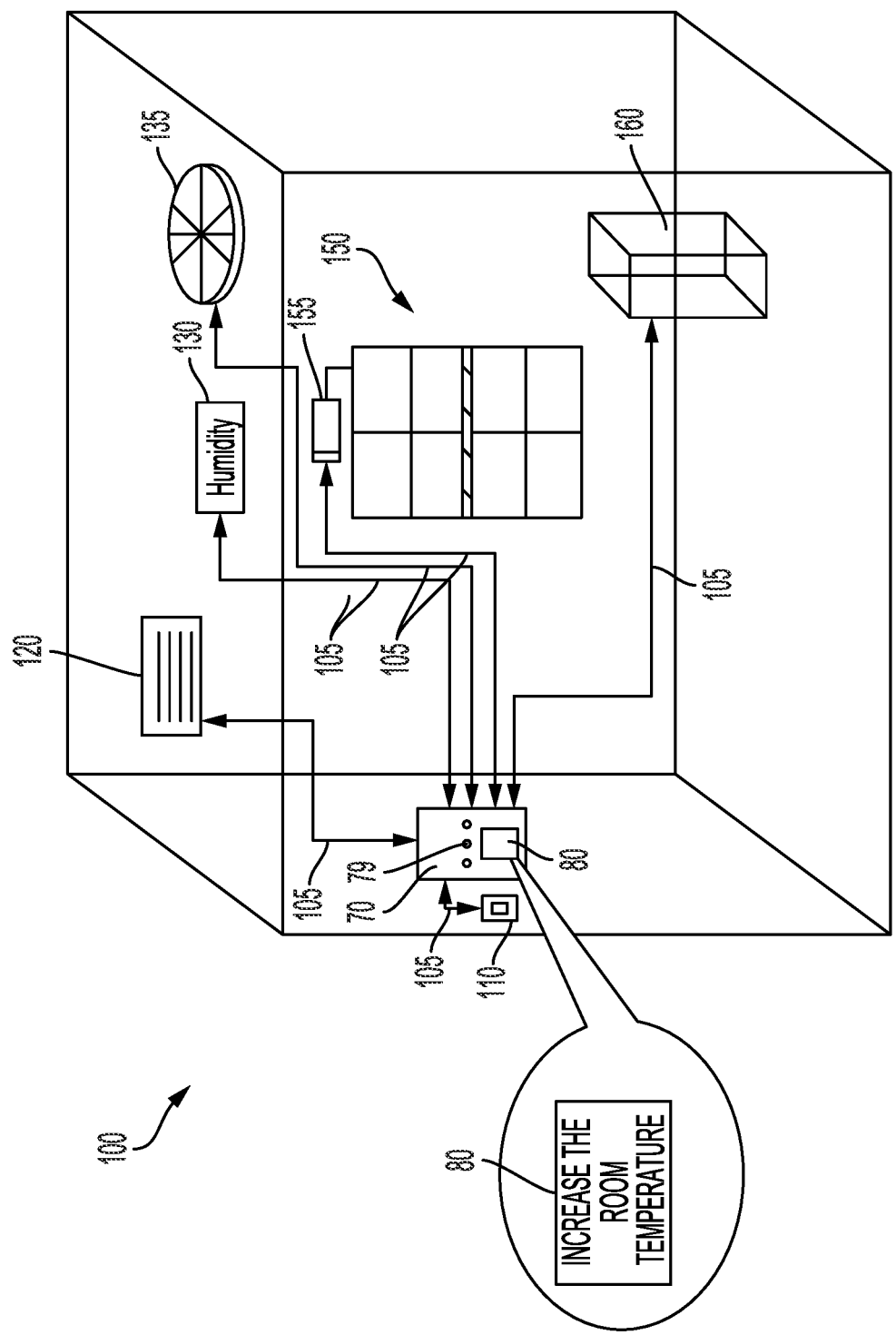
FIG. 2 schematically illustrates an SB computing device at an exemplary site location in accordance with one or more embodiments of the present disclosure.

FIG. 2 schematically illustrates the sensors-based computing device 70 at an exemplary site location 100 in accordance with one or more embodiments of the present disclosure. The exemplary site location 100 may be a room in a building with computer-controlled environment control equipment. The sensor-based computing device 70 may communicate 35 over the communication network 30 with the server 30. The SB computing device 70 may relay sensor data (e.g., typically digitized sensor data) received from the plurality of sensors over the communication network to the sensor data collection 22 module in the server 15. Subsequently, the SB computing device 70 may receive a first instruction from the GUI controller 40 over the communication network 30 to display recommendations (e.g., "INCREASE THE ROOM TEMPERATURE") on the GUI 80 and/or to activate an audible alert such as, for example, when an environmental hazard type in the room is detected and verified. Similarly, the SB computing device 70 may receive a second instruction from the ECE manager 35 over the communication network 30 to change an operational parameter environment control equipment located at the site location so as to mitigate the environmental hazard type in the room.

In some embodiments, the site location 100 may include the computer-controlled environment control equipment such as, for example, a computer-controlled thermostat 110, a computer-controlled vent 120 to vent air between the interior to the room to the outside, a computer-controlled humidifier/dehumidifier unit 130, a computer-controlled ceiling fan for dispersing indoor air, a window 150 that may be opened or closed by a computer-controlled motorized window actuator 155, and/or a computer-controlled air filter 160 in the room. Each of the computer-controlled environment control equipment may have circuitry to allow each of the computer-controlled environment control equipment to communicate 105 with the sensor-based computing device 70. In other embodiments, any or all of the computer-controlled environment control equipment may be operated manually, for example, by the user 90 receiving a remediation recommendation to "open the window", for example, either on GUI 80 and/or GUI 96.

Figure 3:
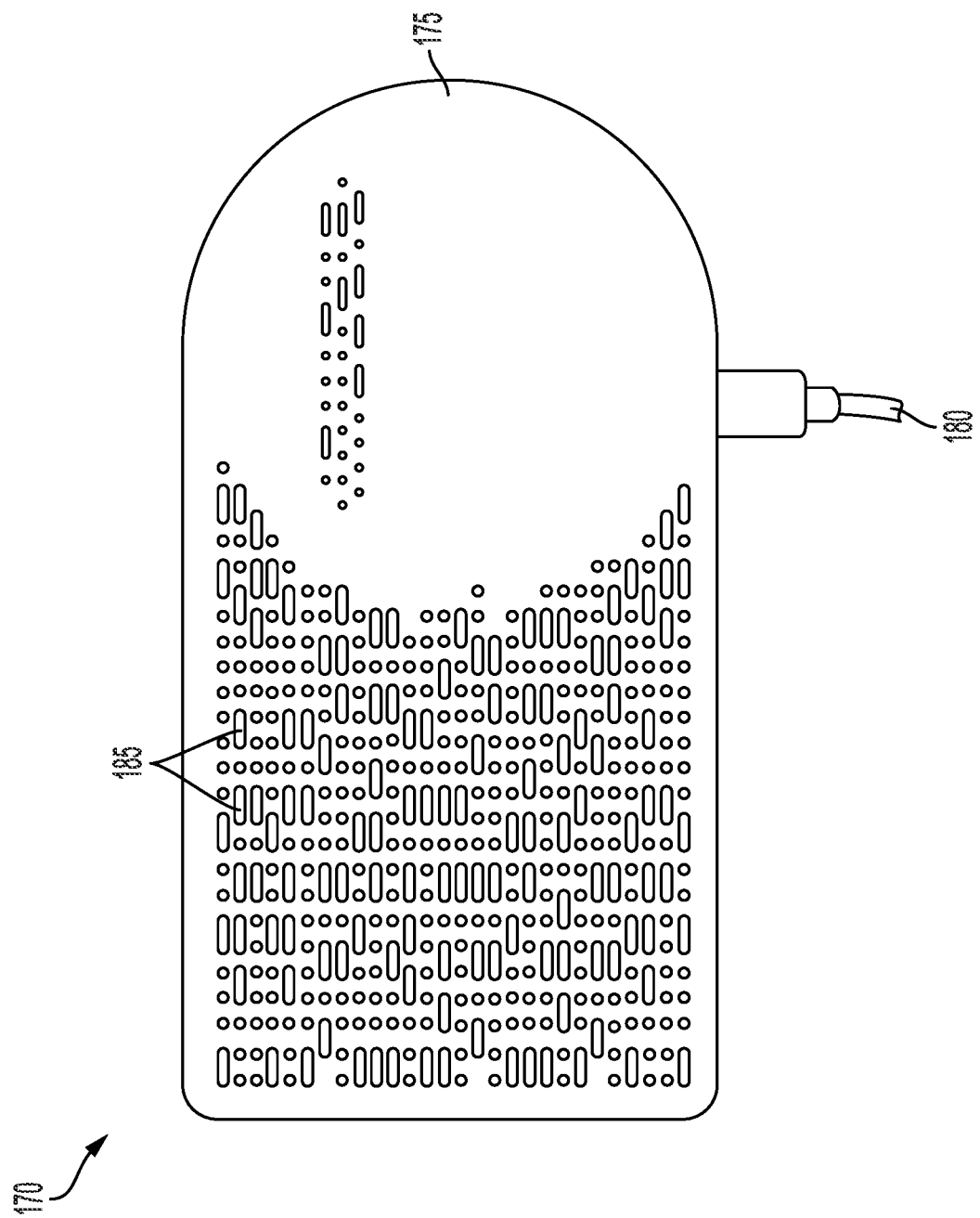
FIG. 3 is a diagram of an exemplary SB computing device in accordance with one or more embodiments of the present disclosure.

The embodiments shown in FIGS. 1 and 2 are merely for visual and conceptual clarity and not by way of the embodiments disclosed herein. The SB computing device 70 may include only sensors, processing and communication circuitry without a display such that the SB computing device 70 may merely sense the environment at the site location using the plurality of sensors and may relay the sensor data to the server 15 as shown in the example of FIG. 3 below. Subsequently, the server 15 may issue alerts to a user 90 via the GUI 96 on the mobile computing device associated with a user 90, for example. The user 90 may be an occupant of the room. The alert may be an audible alarm, a visual alert, an electronic alert message, or any combination thereof.

FIG. 3 is a diagram of an exemplary SB computing device 170 in accordance with one or more embodiments of the present disclosure. The SB computing device 170 may include circuitry deployed within a case 175 formed from any suitable material. The circuitry may include the plurality of sensors 72, the conditioning and driver circuitry 74, the processor 75 and the communication circuitry 82 for communicating 35 over the communication network 30. A power cord 180 may be connected to wall output for example, to power the circuitry. The case 175 may include a plurality of holes 185 formed in the case 175 for allowing each of the plurality of sensors 72 to contact and/or sample the environment proximal to the SB computing device 170.

In some embodiments, the SB computing device 170 and/or the SB computing device 70 may communicate 35 over a Wireless Fidelity (Wi-Fi) network, or any suitable communication protocol. The sensor data from each SB computing device may be captured and then transmitted to a cloud environment such as Amazon Web Services (AWS), for example.

In some embodiments, the server 15 (e.g., the sensor data collection 22 module) may use an application programming interface (API) and data fetcher that reaches into the TSI cloud (e.g., cloud computing services from TSI healthcare) and pulls the data need by the health impact score algorithm 24, which is subsequently loaded to the cloud environment (e.g., AWS). The TSI cloud may continuously receive the data from the sensors, but the sensor data collection 22 module may pull the needed data to the AWS cloud at predefined time intervals such as every 15 minutes.

In some embodiments, the SB computing device 170 as shown in FIG. 3 may have dimensions of 6-7 inches long and 5 inches wide with a thickness of 1 inch. The plurality of sensors 72 in the SB computing device 170 may sense environment hazards at a site location (e.g., a room) covering an area ranging from 1000-5000 square feet.

In some embodiments, once a particular SB computing device 170 may detect at least one verified environment health hazard type when the processor 20 analyzes the sensor data from the plurality of sensors in the particular SB computing device 170 located in a particular room, the server 15 may issue alerts to the GUI 96 of the computing devices associated with the users that are the occupants of the particular room.

In some embodiments, the server 15 may send batch alerts to the GUI 96 on a plurality of computing devices 95 associated a plurality of users where each of the plurality of users may be at least one site location with at least one verified environmental hazard type. For example, the server 15 may track the details of each user that have entered the building and their location in the building using location tracking devices, for example, in the user's computing device 95.

In some embodiments, a user computing device 95 may be a central facility computing device of a business or company. A plurality of SB computing devices 70 may be deployed in a plurality of site locations 20 (e.g., rooms) in a plurality of buildings at different geographical locations associated with the business. The plurality of SB computing devices 70 may relay the sensor data in each room in each building to the central facility computing device associated with the business or company. The GUI 96 may display the status of the environment and may alert a maintenance officer of the business or company about the presence of any verified health hazard types in any of the rooms.

In some embodiments, the company may be, for example, a very large nursing home company that has hundreds of nursing homes, and/or extended care facilities. The user such as a maintenance officer may see a home screen on GUI 96 that may show a map of the United States with click buttons in each location around the country where a particular nursing home and/or extended care facility may be located. The maintenance officer in a central facility in New York, for example, may be able to access a page for a nursing home in Orlando, Fla., for example, and further drill down to a particular room in the Orlando nursing home to view the health statistics that are sensed by a particular SB computing device from the plurality of SB computing devices 70 in the particular room.

Figure 4:
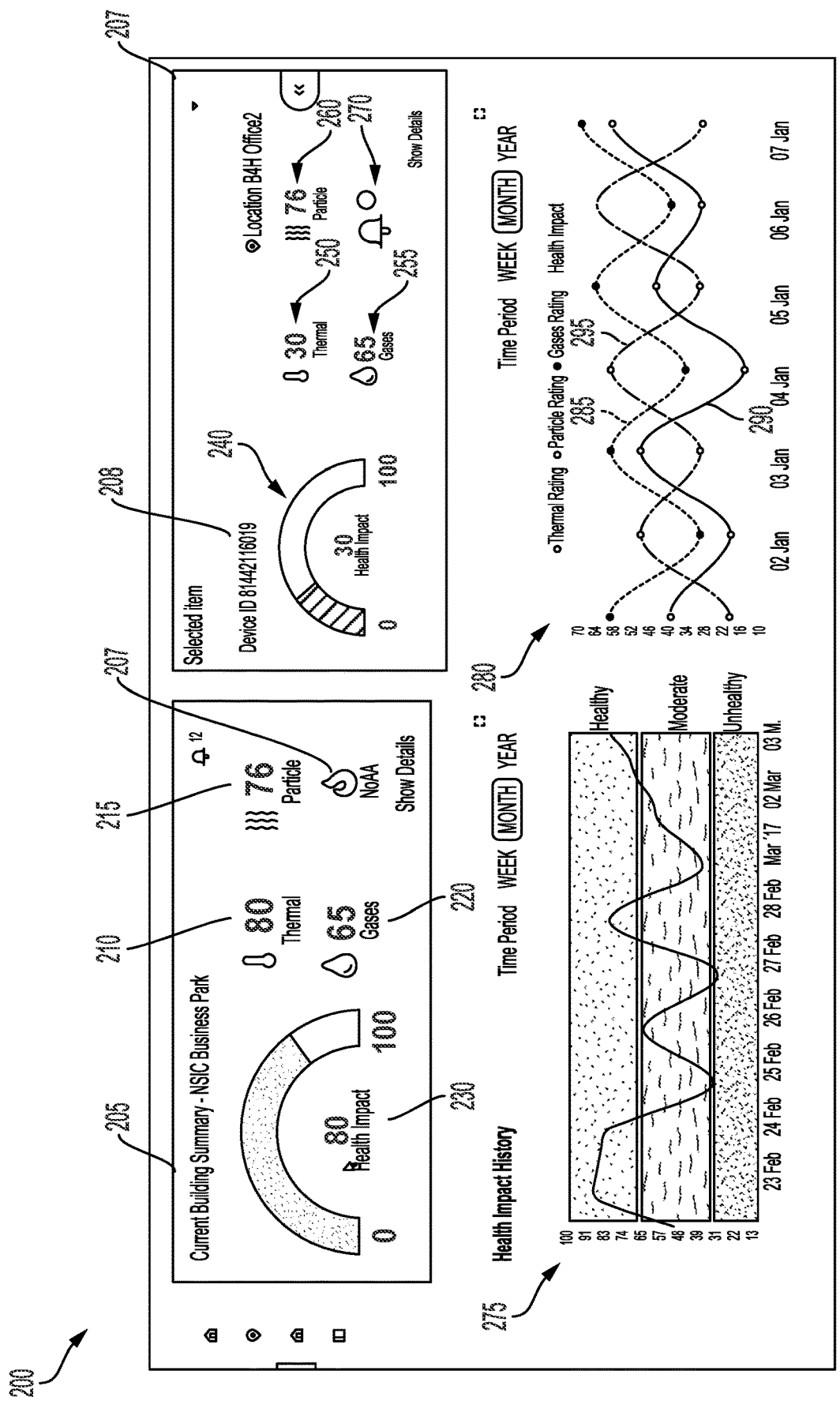
FIG. 4 is an exemplary snapshot of the graphic user interface (GUI) displayed on a display in accordance with one or more embodiments of the present disclosure.

FIG. 4 is an exemplary snapshot 200 of the graphic user interface (GUI) 96 displayed on the display 95 in accordance with one or more embodiments of the present disclosure. The exemplary snapshot 200 in this example may refer to a building with a plurality of rooms. The SB computing device 170 such as shown in FIG. 3 may be deployed in each room. The computing device 95 associated with the user 90, such as the building manager or handyman maintaining the building, may receive environment health sensor updates on the overall building 205 and in a particular room 207. The GUI 96 may include an overall health impact rating (HIR) 230 in the building (e.g., NSIC Business Park in this exemplary case), a thermal HIR 210 based on the temperature detected in the rooms of building environment, a gases HIR 220 based on gases detected in the rooms of the building environment, and a particle HIR 215 based on particulate matter or particles detected in the air in the rooms of the building environment.

In some embodiments, the health impact ratings detected from the SB computing device 170 for a particular room 207 (e,g, Location—Office Room 2 in the NSIC Business Park Building) may be identified by a device identification number 208 (e.g., 81442116019 in this exemplary case). The GUI 96 on unit in the particular room 207 shows that the overall HIR 240 for this room is 30, the thermal HIR 250 for this room is 30, the gases HIR 255 for this room is 65 and the particle HIR 60 for this room is 76.

In some embodiments, the HIR may indicate a level of environmental hazard of a particular type such as thermal, gases, and/or particles (e.g., particulate matter in the air). The HIR rating may include four health impact quartiles, for example, in a particular environment where an HIR of 75-100 is Excellent, an HIR of 50-75 is Good to Acceptable, an HIR of 25-50 Needs Remediation, and an HIR of 0-25 is Hazardous. In other embodiments, the HIR ranges may be defined as 0-24 as being unhealthy, 25-49 as being moderate, and 50-100 as healthy. Any suitable range definition may be used.

In some embodiments, predefined thresholds for the overall, particle, gases and particle HIR may be defined for example at a value of 49, for example. Thus the SB computing device 170 may issue an alert 270 due to detecting an unhealthy temperature HIR rating of 30 in the particular room 207 (e,g, Location—Office Room 2 in the NSIC Business Park Building).

In some embodiments, the GUI 96 may display an overall health impact rating history 275 of the entire building or a particular room over a time period of a week, a month, and/or a year that the user may choose on the GUI 96. Similarly, the GUI 96 may display a historical thermal HIR 295, a historical gases HIR 285, and a historical particle HIR 290.

In some embodiment, the GUI 96 may activate an icon 207 indicating that the outdoor air quality outside of the building is good based on measurements from the external sensors. In other embodiments, the SB computing device 170 unit may be placed outside of the building to compare the air quality inside of site location (e.g., inside the building) to the air quality outside of the site location (e.g., outside of the building).

Figure 5:
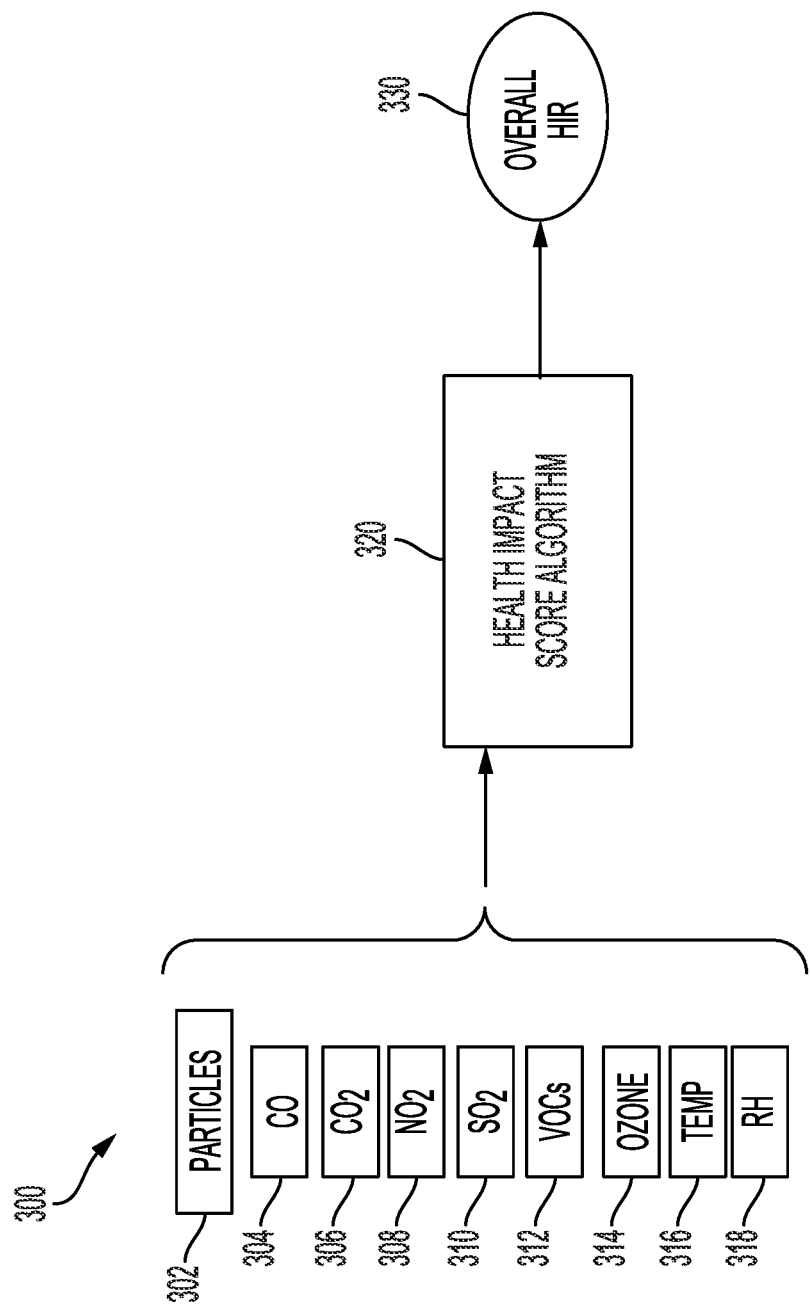
FIG. 5 is a flow diagram using a plurality of environmental sensors in an health impact score algorithm in accordance with one or more embodiments of the present disclosure.

FIG. 5 is a flow diagram 300 using a plurality of health sensors in an health impact score algorithm 320 in accordance with one or more embodiments of the present disclosure. The plurality of health sensors 72 may include an ozone sensor, outputting an ozone output data measurement 314, a humidity sensor, outputting a humidity or a relative humidity RH output data measurement 318, a temperature sensor, outputting a temperature output data measurement (TEMP) 316, a carbon dioxide sensor, outputting a carbon dioxide (CO2) output data measurement 306, a carbon monoxide sensor, outputting a carbon monoxide (CO) output data measurement 304, a nitrous dioxide sensor, outputting a nitrous dioxide (NO2) output data measurement 308, a sulfur dioxide sensor, outputting a sulfur dioxide (SO2) output data measurement 310, a total volatile organic compound (tVOC) sensor, outputting a VOCs output data measurement 312, and at least one particulate matter sensor, outputting at least one particulate matter output data measurement (PARTICLES) 302.

Note that the ten unique environmental sensor types for collecting the ten sensor data values have been chosen based on the individual and interacting impact of measured components on human physiology and microbial viability. The sensor data from each sensor type may be weighted according to its influence on other indoor pollutants. If sensor data from a particular sensor type is not collected due to sensor malfunction, for example, the algorithms may become less comprehensive. Conversely, if a sensor detects a low insignificant level of a given pollutant, the integrity of the algorithm may still be maintained. Note that the use often unique environmental sensor types is not by way of limitation of the embodiments disclosed herein, any suitable number of unique environmental sensor types may be used.

The sensors may include (1) Airthings Wave Plus sensors, Airthings, Wergelandsveien 7, 0167 Oslo, Norway, (2) Kaiterra Sensedge Commercial Air Quality Monitor, Kaiterra, Crans Mont., VS3974, Switzerland, and (3) TSI AirAssure sensor, TSI Inc., 500 Cardigan Road, Shoreview, Minn. 55126 U.S.A.

In some embodiments, the total volatile organic compound (tVOC) sensor may be configured to detect specific volatile organic compounds in the air such as phenol, toluene, trichlorobenzenes, trichloroethylene, vinyl chloride, and/or formaldehyde, for example.

In some embodiments. the at least one particulate matter sensor may include a 10 μm $PM_{10}$ particulate matter sensor, a 2.5 μm $PM_{2.5}$ particulate matter sensor, and a 1 μm $PM_1$ particulate matter sensor. Thus the at least one particulate matter output data measurement (PARTICLES) 302 may be based on a $PM_{2.5}$ particulate matter output data measurement, a $PM_{2.5}$ particulate matter output data measurement, and a $PM_1$ particulate matter output data measurement.

Each of the plurality of output data measurements from each of the respective sensors may be inputted into an health impact score algorithm 320 (or the health impact score algorithm 24 of FIG. 1). Each of the health impact scores for each pollutant may be outputted from the health impact score algorithm 320. In some embodiments, the HIR values may be calculated when normalizing the HI(f) values to an ozone and relative humidity factor based on the ozone output data measurement 314, and the relative humidity RH output data measurement 318.

In some embodiments, the health impact score HI(RH) related to the relative humidity sensor output data measurement 318 may be computed from equation (1) where $C_{RH}$ is the relative humidity concentration obtained from the relative humidity sensor output data measurement 318, breakpoint values $BP_{Hi}$ and $BP_{Lo}$ of $C_{RH}$ and index breakpoint values $I_{Hi}$ of $BP_{Hi}$ and $I_{Lo}$ of $BP_{Lo}$, constants that may be obtained from medical studies and/or exposure studies. These breakpoint values may be stored in the breakpoint value database 60.

$$HI(RH) = \frac{(C_{RH} - BP_{Lo})}{(BP_{Hi} - BP_{Lo})} \times (I_{Hi} - I_{Lo}) + I_{Lo} \quad (1)$$

Similarly, the health impact score HI(O3) related to the ozone sensor output data measurement 318 may be computed from equation (2) where $C_{O3}$ is the ozone concentration obtained from the ozone sensor output data measurement 314, $RH_f$ is the relative humidity factor based on Equation (1), breakpoint values $BP_{Hi}$ and $BP_{Lo}$ of $C_{O3}$ and index breakpoint values of $BP_{Hi}$ and $I_{Lo}$ of $BP_{Lo}$, constants that may be obtained from medical studies and/or exposure studies. These breakpoint values may be stored in the breakpoint value database 60.

$$HI(O_3) = \frac{(C_{O3} \times RH_f - BP_{Lo})}{(BP_{Hi} - BP_{Lo})} \times (I_{Hi} - I_{Lo}) + I_{Lo} \quad (2)$$

Finally, the health impact ratings HI(f) may be computed using Equation (3) for each of the other f pollutants may be based on the pollutant concentration $C_f$, the relative humidity factor $RH_f$, and an ozone factor $O3_f$. The other f pollutants may include particulate matter PARTICLES, carbon monoxide CO, carbon dioxide $CO_2$, nitrous dioxide $NO_2$, sulfur dioxide $SO_2$, total volatile organic compound tVOCs, and temperature TEMP each having respective concentrations denoted by $C_f = \{C_{PM10}, C_{PM2.5}, C_{PM1}, C_{tVOC}, C_{NO2}, C_{SO2}, C_{CO}, C_{CO2}, C_T\}$ $$HI(f) = \frac{(C_f \times RH_i \times O3_f - BP_{Lo})}{(BP_{Hi} - BP_{Lo})} \times (I_{Hi} - I_{Lo}) + I_{Lo} \quad (3)$$

Thus, the health impact score algorithm may compute using Equations (1)-(3), the set of health index score (HI) values including {a 10 µm particulate matter health index score HI(PM$_{10}$), a 2.5 µm particulate matter health index score HI(PM$_{2.5}$), a 1 µm particulate matter health index score HI(PM$_1$), a total volatile organic compound health index score HI(tVOC), a nitrous dioxide health index score HI(NO$_2$), a sulfur dioxide health index score HI(SO$_2$), a carbon monoxide health index score HI(CO), an ozone health index score HI(O3), a carbon dioxide health index score HI(CO$_2$), a relative humidity health index score HI(RH), a temperature health index score HI(Temp)}. Each of the health index scores is based is least in part on the environmental output data measurements from the plurality of environmental sensors.

As shown in FIG. 4, the HIR for gases 220 may be the lowest HI value related to gases in the set of HI values (e.g., HI(tVOC), HI(NO$_2$), HI(SO$_2$), HI(CO), HI(O3), HI(CO$_2$)), the HIR for particles 215 may be the lowest HI value related to particles (e.g., HI(PM$_{10}$), HI(PM$_{2.5}$), HI(PM$_1$)) in the set of HI values, the HIR for thermal conditions 210 is HI(Temp). The overall HIR 330 may be derived from the lowest value in the set of HI values, e.g., the lowest of any one of {HI(PM$_{10}$), HI(PM$_{2.5}$), HI(PM$_1$), HI(tVOC), HI(NO$_2$), HI(SO$_2$), HI(CO), HI(O3), HI(CO$_2$), HI(RH), HI(Temp)}.

In some embodiments, the health impact score algorithm 320 may use short term acceptable exposure levels making the limits conservative and safest for each health impact zone. Continuous monitoring may be used to capture all conditions where each of the HI values in the set above is weighted according to interactions with concurrent relative humidity and ozone to establish a single, dynamic, multi-pollutant aggregated health impact rating. As a result, pollutant concentrations may be related to the safest international medical thresholds.

FIG. 6 is a table 400 showing the breakpoint values for different pollutants in accordance with one or more embodiments of the present disclosure. The aggregate HI values may be determined by selecting the pollutant with the highest pollutant index so as to avoid exaggerated measurements (ambiguity) found with adding HI values or lack of action (eclipsing) found with averaging HI values. Thus, the overall HIR is computed using the lowest HI value at a particular site location and not by averaging, adding, or multiplying individual pollutant indices. The HI values may be used to create a continuous scale which can be categorized as good 460, normal 465, unhealthy for sensitive groups 470, unhealthy 475, very unhealthy 480, and hazardous 485) which are used in the computation of the HI(f) values. The health impact score (HI) values may be normalized to create a health impact rating (HIR).

In the table 400, the breakpoint values $BP_{LO}$ and $BP_{HI}$ are for ozone 410, for PM$_{1.0}$ 415, for PM$_{2.5}$ 420, for PM$_{10}$ 425, for CO 430, for CO$_2$ 435, for total VOCs 440, for SO$_2$ 445, and for NO$_2$ 450. Each shows breakpoint values in each of the six zones.

FIG. 7 is a table 500 showing a second embodiment for computing health impact scores in accordance with one or more embodiments of the present disclosure. The equations shown for computing the HI(f) scores are a different, second embodiment for computing HI(f) in contrast to Equations (1)-(3). In this exemplary second embodiment, the HI scores may be measured having maximum exposure levels taken over a predefined time interval such as eight hours, for example. There is no need to consider the six threshold regions as shown in FIG. 6 for use in the first HI(f) model. In this case, the HI(f) model may use a continuous slope model that may be fit to the HI score data using two fitting polynomials. Thus, each pollutant, or measured compound (f) 505 in table 500 for each HI(f) 510 may have a unique equation 520 as shown in FIG. 7 in contrast to Equation (3) in the first HI(f) model. Each equation may be a function of the pollutant concentration value and the square of the pollutant concentration value. Multi-aggregate weighting 530 may be applied to the unweighted HI(f) parameter. The weights may be taken from the peer reviewed medical and epidemiological literature including the Cochran database, a public database for healthcare decision-making, to adjust the HI(f) values. The last column shows the total amount 540 that the HI may be changed by relative humidity.

In some embodiments, each of the health index scores HI described in Equations (1)-(3) and/or in FIG. 7 is based is least in part on the environmental output data measurements from the plurality of environmental sensors. In other embodiments, environmental output data measurements may be the measured pollutant concentrations (e.g., $C_{RH}$, $C_{O3}$, $C_{PM10}$, $C_{PM2.5}$, $C_{PM1}$, $C_{tVOC}$, $C_{NO2}$, $C_{SO2}$, $C_{CO}$, $C_{CO2}$, $C_T$).

It should be noted that the two exemplary health impact algorithms for computing the health impact scores as shown in FIGS. 5-7 and defined in equations (1)-(3) are not by way of limitation of the embodiments disclosed herein. Any suitable health impact algorithm may be used by system 10 and/or the SB computing device N 70B to compute the health impact scores as used herein to assess environmental hazards and for automatically managing the indoor environment for optimum occupant health.

Figure 8:
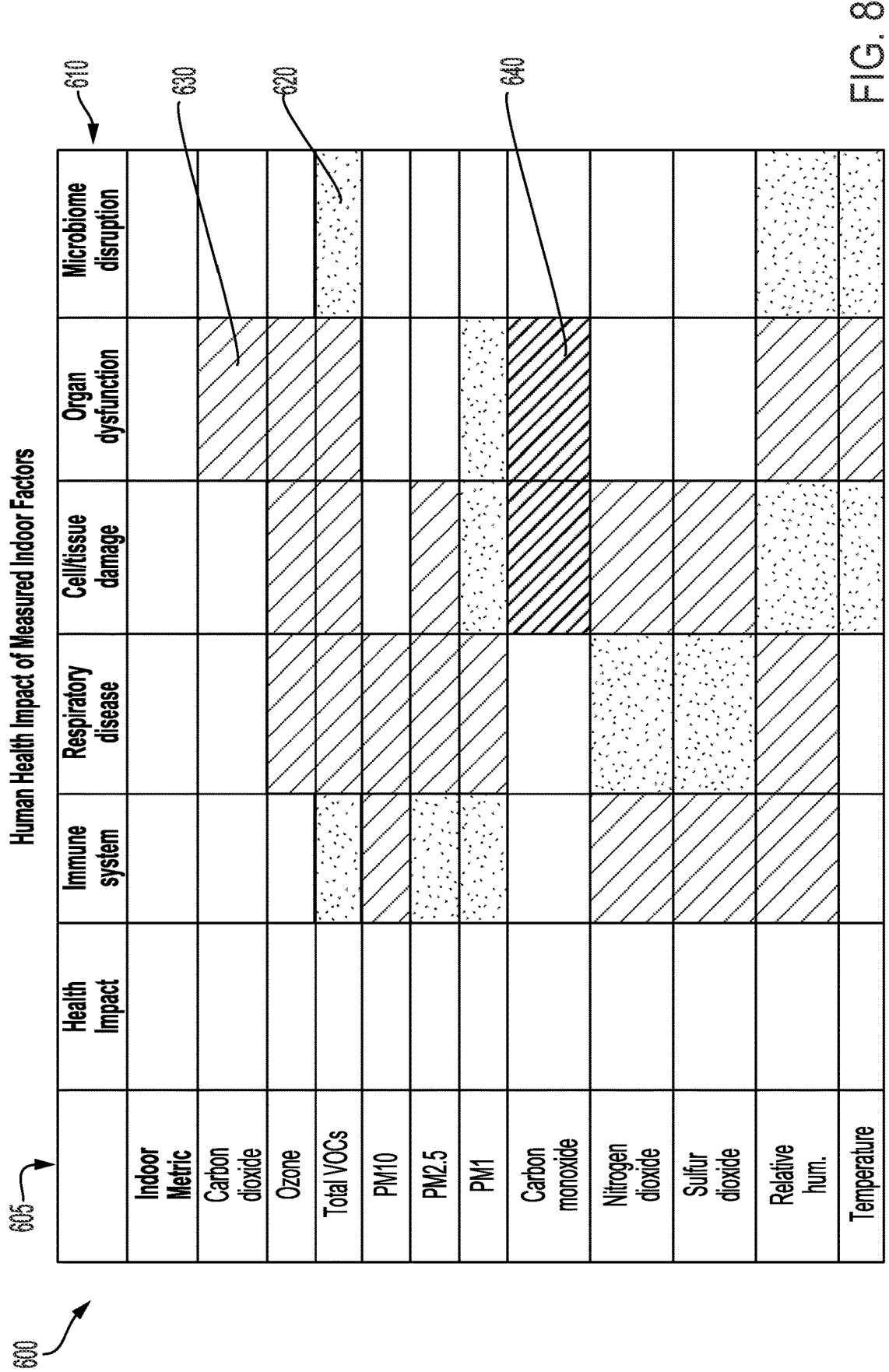
FIG. 8 is a table showing human health impact of measured indoor factors in accordance with one or more embodiments of the present disclosure.

FIG. 8 is a table 600 showing human health impact of measured indoor factors in accordance with one or more embodiments of the present disclosure. The table 600 shows different indoor metrics 605 such as carbon dioxide, ozone, total VOCs, PM10, PM2.5, PM1, carbon monoxide, nitrogen dioxide, sulfur dioxide, relative humidity, and temperature. A health impact 610 on the immune system, respiratory disease, cell/tissue damage, organ dysfunction, and microbiome disruption may be shown as a function of each indoor metric and classified (by hashing) as low health hazard and impact 620, moderate health hazard and impact 630, and high health hazard and impact 640.

In some embodiments, once different pollutant concentrations are determined from the plurality of sensors and the health impact scores may be computed, at least one verified environmental hazard type related to any of the pollutants in FIG. 8, for example, may be determined at the site location when at least one particular health impact score of the plurality of health impact scores is less than a respective predefined threshold score that is unique to the at least one particular environmental parameter (e.g., concentrations and/or levels of particulate matter PARTICLES, carbon monoxide CO, carbon dioxide $CO_2$, nitrous dioxide $NO_2$, sulfur dioxide $SO_2$, total volatile organic compound tVOCs, temperature TEMP, ozone, humidity).

In some embodiments, the processor 20 and/or the sensor based computing device processor 75 may use the computed set of health impact scores {HI($PM_{10}$), HI($PM_{2.5}$), HI($PM_1$), HI(tVOC), HI($NO_2$), HI($SO_2$), HI(CO), HI(O3), HI($CO_2$), HI(RH), HI(Temp)} for each of the different pollutant types to determine if at least one environmental hazard type is present in the site location. The processor 20 and/or the SB computing device processor 75 may determine if there is at least one verified environmental hazard type when at least one particular health impact score in the set of HI scores is less than a predefined threshold score that is unique to the at least one particular environmental parameter or pollutant. For example, the predefined threshold score may be different or unique for each pollutant in the set of HI scores. In other embodiments, the predefined threshold score may be the same threshold score for all of the different pollutants.

For example, a health hazard may exist for carbon dioxide when the HI score for carbon dioxide is below a predefined score of 50, whereas the health hazard may exist for ozone when the HI score for ozone is below a predefined score of 70. When HI for a particular pollutant is below the predefined threshold score, then that pollutant become a verified environmental hazard type, where there are carbon dioxide concentrations or sulfur dioxide concentrations, for example, that are too high in the site location and more specifically in the indoor environment at the site location.

In some embodiments, the machine learning model 28 may generate at least one recommendation for remediating the at least one verified environmental hazard type when inputting the plurality of health impact scores {HI($PM_{10}$), HI($PM_{2.5}$), HI($PM_1$), HI(tVOC), HI($NO_2$), HI($SO_2$), HI(CO), HI(O3), HI($CO_2$), HI(RH), HI(Temp)} into the at least one machine learning model. The at least one recommendation may be executed manually by the user 90, for example, or as shown in the embodiments of FIG. 2, the at least one remediation recommendation may be used to generate instructions which may be transmitted by the ECE manager 35 over the communication network 30 to automatically control at least one environment-controlling equipment located at the at least one site location so as to change an operational parameter of the at least one environment-controlling equipment to mitigate the at least one verified environmental hazard type.

In some embodiments, the machine learning model 28 may be, for example, a classification neural network model trained to map the set of health impact score to remediation recommendations and/or remediation actions for mitigating the at least one verified environmental hazard type as described below with reference to Table I.

In some embodiments, a computer-controlled window actuator (e.g., an environment-controlling equipment) may have the window set to be closed, where the closed window is an operational parameter of the environment-controlling equipment. The SB computing device may detect, for example, that the concentration of tVOCs are too high, the processor 20 and/or the sensor based computing device processor 75 may send instructions via the ECE manager 35 and/or ECE controller 85 to change the operational parameter of the environment-controlling equipment (e.g., initially closed window and/or closed vent 120) by opening the window 150 and/or opening the ceiling vent 120 and/or activating the ceiling fan 135, for example.

In some embodiments, the following Table I is an exemplary output from the machine learning model 28 that may be used to generate instructions to transmit to the at least one environment-controlling equipment located at the site location. The computer-controlled equipment may include actuated environmental control devices, for example, with reference to FIG. 2. The instructions may trigger the computer-controlled actuators in the equipment to automatically increase or decrease outdoor air fraction in the room by controlling the vent 120, disperse indoor air in the room by controlling the fan 135, raise or lower a temperature of the room by controlling the thermostat 110, raise or lower humidity in the room by controlling the humidifier/dehumidifier 130, activate or deactivate air cleaners in the room by controlled the air filter 160, or any combination thereof.

In some embodiments, the machine learning model 28 may be used to determine which action recommendations are most effective in raising the health impact scores, to predict the times of day that certain pollutant variables are likely to have certain concentrations so that the users may take preventive actions, and/or to fine tune the sensor data according to evolving research.

The remediation recommendation actions generated by the machine learning model 28 for the different pollutants are shown below in Table I:

TABLE I

| Remediation recommendation actions (in bold) |
| --- |

- Particles
  - Dilute
    - If (indoor RH < 40% && outdoor RH > indoor RH && outdoor HIR >= indoor HIR):
      - "Increase outside air fraction to dilute indoor particles"
    - If (indoor RH < 40% && outdoor RH < indoor RH) :
      - "Decrease outdoor air fraction and turn on humidifier (if available) to decrease indoor particles"
    - If (indoor RH > 60% && outdoor RH < indoor RH && outdoor HIR >= indoor HIR):
      - "Increase outdoor air fraction to dilute indoor particles"
    - If (outdoor HIR > indoor HIR) :
      - "Increase outdoor air fraction to dilute indoor particles"
  - Disperse
    - If (outdoor HIR < indoor HIR) :
      - "Decrease outdoor air fraction and increase exhaust rate (if available) to disperse indoor particles"
  - Remove
    - If (other remediations don't work):
      - "Replace/Upgrade filters on existing air handling units (if available) to decrease indoor particles"
- tVOCs
  - Dilute
    - If (indoor RH < 40% && outdoor RH > indoor RH && outdoor HIR >= indoor HIR):
      - "Increase outdoor air fraction to dilute total Volatile Organic Compounds"
    - If (indoor RH > 60% && outdoor RH < indoor RH && outdoor HIR >= indoor HIR):
      - "Increase outdoor air fraction to dilute total Volatile Organic Compounds"
    - If (indoor RH > 60% && outdoor RH > indoor RH):
      - "Decrease outdoor air fraction and dehumidify to return Relative Humidity to between 40-60%"
    - If (indoor temp < 72 degrees F.) :
      - "Increase indoor temperature up to 72° F. to return Relative Humidity to between 40-60%"
    - If (outdoor HIR > indoor HIR) :
      - "Increase outdoor air fraction to dilute total Volatile Organic Compounds"
  - Disperse
    - If (outdoor HIR < indoor HIR):
      - "Decrease outdoor air fraction and increase exhaust (if available) to disperse total Volatile Organic Compounds"
- RH
  - If (indoor RH > 60% && outdoor RH < 40% && outdoor HIR >= indoor HIR):
    - "Increase outdoor air fraction to increase ventilation to return Relative Humidity to between 40-60%"
  - If (indoor RH > 60% && outdoor RH > 60%) :
    - "Turn on dehumidifier (if available) or increase the temperature to return Relative Humidity to between 40-60%"
  - If (indoor RH < 40% && outdoor RH > 40%) :
    - "Increase outdoor air fraction to return Relative Humidity to between 40-60%"
  - If (indoor RH < 40%)
    - "Turn on humidifier (if available) or lower the temperature to return Relative Humidity to between 40-60%"
- Temperature
  - Too high
    - If (outdoor temperature is between 68-73° F. && outdoor HIR >= indoor HIR):
      - "Increase outdoor air fraction to decrease temperature. Maintain a temperature between 68-73° F."
    - Or else:
      - "Decrease the temperature. Maintain a temperature between 68-73° F."
  - Too low
    - If (outdoor temperature is between 68-73° F. && outdoor HIR >= indoor HIR):
      - "Increase outdoor air fraction to increase temperature. Maintain a temperature between 68-73° F."
    - Or else:
      - "Increase the temperature. Maintain a temperature between 68-73° F."
- $CO_2$
  - Dilute
    - If (outdoor HIR > indoor HIR) :
      - "Increase outdoor air fraction to dilute Carbon Dioxide"

TABLE I-continued

| Remediation recommendation actions (in bold) |
|---|

- ○ Disperse
  - ❖ If (outdoor HIR < indoor HIR) :
    - ➤ "Decrease outdoor air fraction and increase exhaust (if available) to disperse Carbon Dioxide"
- $O_3$
  - ○ Dilute
    - ❖ If (outdoor HIR > indoor HIR) :
      - ➤ "Increase outdoor air fraction to dilute Ozone"
  - ○ Disperse
    - ❖ If (outdoor HIR < indoor HIR) :
      - ➤ "Decrease outdoor air fraction and increase exhaust (if available) to disperse Ozone"
  - ○ Control Source
    - ❖ If (Dilute and Disperse don't work) :
      - ➤ "Turn off electronic devices that may be producing Ozone"
- CO
  - ○ Dilute
    - ❖ If (outdoor HIR > indoor HIR) :
      - ➤ "Increase outdoor air fraction to dilute Carbon Monoxide"
  - ○ Disperse
    - ❖ If (outdoor HIR < indoor HIR) :
      - ➤ "Decrease outdoor air fraction and increase exhaust (if available) to limit Carbon Monoxide infiltration"
  - ○ Control Source
    - ❖ If (Dilute and Disperse don't work) :
      - ➤ "Find and eliminate any source of indoor gas production (for example cooking fumes or fire in fireplace)"
- $NO_2$
  - ○ "Decrease outdoor air fraction and increase exhaust (if available) to limit Nitrogen Dioxide infiltration"
- $SO_2$
  - ○ "Decrease outdoor air fraction and increase exhaust (if available) to limit Sulfur Dioxide infiltration"

In some embodiments, the remediation recommendation actions shown in bold in Table I may cause the processor 20 to transmit first instructions to the SB computing device 70 to display on the display 80 and/or on the GUI 96, a remediation action message and/or to sound an alarm, for example. In other embodiments, the remediation recommendation actions shown in bold in Table I may cause the processor 20 using the ECE manager 35 to transmit second instructions to the ECE controller 85 to automatically change the operational parameter of the environment-controlling equipment as previously described.

Figure 9:
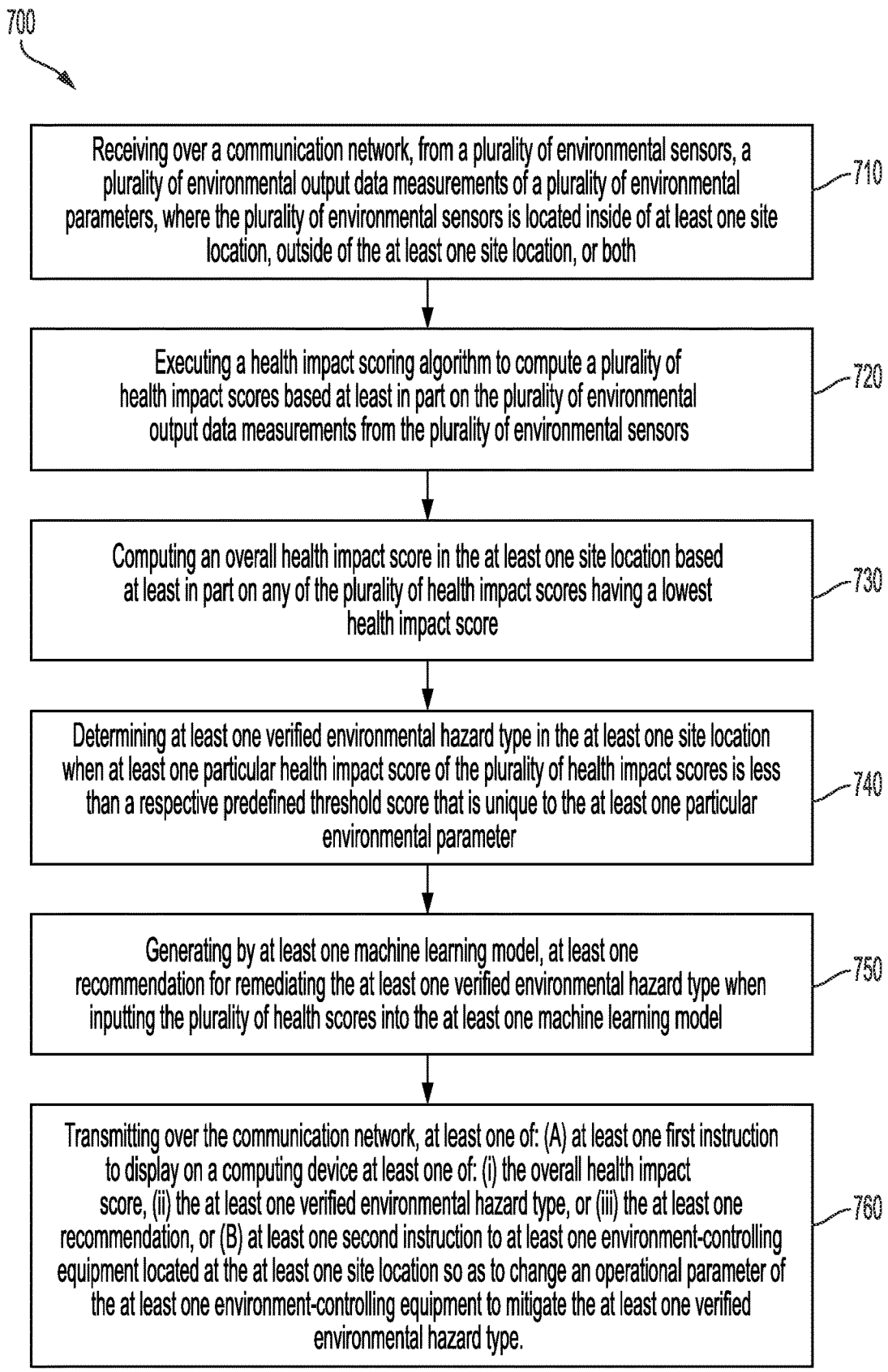
FIG. 9 illustrates a flowchart of an exemplary method for assessing and managing a health impact of an indoor environment at a site location in accordance with one or more embodiments of the present disclosure.

FIG. 9 illustrates a flowchart of an exemplary method 700 for assessing and managing a health impact of an indoor environment at a site location in accordance with one or more embodiments of the present disclosure. The method may be performed, for example, by the processor 20.

The method 700 may include receiving 710 over a communication network, from a plurality of environmental sensors, a plurality of environmental output data measurements of a plurality of environmental parameters, where the plurality of environmental sensors is located inside of at least one site location, outside of the at least one site location, or both.

The method 700 may include executing 720 an health impact scoring algorithm to compute a plurality of health impact scores based at least in part on the plurality of environmental output data measurements from the plurality of environmental sensors. A first exemplary embodiment of the health impact scoring algorithm 24 may be given by Equations (1)-(3) where each of the health impact scores for each of the different pollutants may be further based on any of an ozone factor, a relative humidity factor, and/or predefined pollutant-specific breakpoint hazard values as shown for example in FIG. 6. A second exemplary embodiment of the health impact scoring algorithm 24 may be further based on using a value from each of the plurality of environmental output data measurements and a square of the value.

The method 700 may include computing 730 an overall health impact score in the at least one site location based at least in part on any of the plurality of health impact scores having a lowest health impact score.

The method 700 may include determining 740 at least one verified environmental hazard type in the at least one site location when at least one particular health impact score of the plurality of health impact scores is less than a respective predefined threshold score that is unique to the at least one particular environmental parameter.

The method 700 may include generating 750 by at least one machine learning model, at least one recommendation for remediating the at least one verified environmental hazard type when inputting the plurality of health impact scores into the at least one machine recommendation learning model.

The method 700 may include transmitting 760 over the communication network, at least one of: (A) at least one first instruction to display on a computing device at least one of: (i) the overall health impact score, (ii) the at least one verified environmental hazard type, or (iii) the at least one recommendation, or (B) at least one second instruction to at least one environment-controlling equipment located at the at least one site location so as to change an operational parameter of the at least one environment-controlling equipment to mitigate the at least one verified environmental hazard type.

The sensor-based computing device 70 as disclosed herein provides a technical solution for harmonizing a common sensing process using multiple environmental sensors to automatically assess a health impact of an indoor environment at least one site location by computing a plurality of health impact scores based on the multiple environmental sensor output data. If the system 10 using the sensor-based computing device 70 verifies that at least one verified environmental hazard type exists, the system 10 may automatically implement measures for remediating the at least one verified environmental hazard type by integrating the use of the computed health impact scores to automatically cause changes in operational parameter(s) of environment-controlling equipment to mitigate the at least one verified environmental hazard type at least one site location.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent sensor-based computing devices that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, the communication circuitry 50, 82A, and 82B, for example, may be equipped to communicate over a wired and/or wireless communication medium (e.g., NFC, RFID, NBIOT, 3G, 4G, 5G, GSM, GPRS, WiFi, WiMax, CDMA, satellite, ZigBee, etc.).

In some embodiments, the communication circuitry 50, 82A, and 82B, for example, may provide network access, data transport and/or other services to any computing device coupled to it. In some embodiments, the communication network 30 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the communication network 30 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the communication network 30 may include and implement, as an alternative or in conjunction with one or more of the above, a WiMAX architecture defined by the WiMAX forum. In some embodiments and, optionally, in combination of any embodiment described above or below, the communication network 30 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the communication network 30 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the communication network 30 may also include mass storage, such as network attached storage (NAS), a storage area network (SAN), a content delivery network (CDN) or other forms of computer or machine readable media.

In some embodiments, the server 15 may be a web server (or a series of servers) running a network operating system, examples of which may include but are not limited to Microsoft Windows Server, Novell NetWare, or Linux. In some embodiments, the server 15 may be used for and/or provide cloud and/or network computing.

In some embodiments, the server 15 includes a computer-readable medium, such as a random-access memory (RAM) (e.g., the memory 55) coupled to a processor or FLASH memory (e.g., the processor 20). In some embodiments, the processor 20 may execute computer-executable program instructions stored in the memory. In some embodiments, the processor 20 may include a microprocessor, an ASIC, and/or a state machine. In some embodiments, the processor may include, or may be in communication with, media, for example computer-readable media, which stores instructions that, when executed by the processor 20, may cause the processor 20 to perform one or more steps described herein. In some embodiments, examples of computer-readable media may include, but are not limited to, an electronic, optical, magnetic, or other storage or transmission device capable of providing a processor, such as the processor 20, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, the I/O devices 45 and/or the I/O devices 77A and 77B may also comprise a number of external or internal devices such as a mouse, a CD-ROM, DVD, a physical or virtual keyboard, a display, a speaker, or other input or output devices.

In some embodiments, at least one database of exemplary databases 60 and 65 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques (e.g., the machine learning model 28) chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   receiving, by a processor, over a communication network, from a plurality of environmental sensors, a plurality of environmental output data measurements of a plurality of environmental parameters;
      where the plurality of environmental sensors may be located inside of at least one site location, outside of the at least one site location, or both;
      wherein the plurality of environmental sensors may include:
      (i) an ozone sensor, outputting an ozone output data measurement of the plurality of environmental output data measurements,
      (ii) a humidity sensor, outputting a humidity output data measurement of the plurality of environmental output data measurements,
      (iii) a temperature sensor, outputting a temperature output data measurement of the plurality of environmental output data measurements,
      (iv) a carbon dioxide sensor, outputting a carbon dioxide output data measurement of the plurality of environmental output data measurements,
      (v) a carbon monoxide sensor, outputting a carbon monoxide output data measurement of the plurality of environmental output data measurements,
      (vi) a nitrous dioxide sensor, outputting a nitrous dioxide output data measurement of the plurality of environmental output data measurements,
      (vii) a sulfur dioxide sensor, outputting a sulfur dioxide output data measurement of the plurality of environmental output data measurements,
      (viii) a total volatile organic compound (tVOC) sensor, outputting a tVOC output data measurement of the plurality of environmental output data measurements, and
      (ix) at least one particulate matter sensor, outputting at least one particulate matter output data measurement of the plurality of environmental output data measurements;
   executing, by the processor, a health impact scoring algorithm to compute a plurality of health impact scores based at least in part on the plurality of environmental output data measurements from the plurality of environmental sensors;
      where a humidity health impact score of the plurality of health impact scores may be based at least in part on the humidity output data measurement;
      where an ozone health impact score of the plurality of health impact scores may be based at least in part on the ozone output data measurement;
      where a temperature health impact score of the plurality of health impact scores may be based at least in part on the temperature output data measurement;
      where a carbon dioxide health impact score of the plurality of health impact scores may be based at least in part on the carbon dioxide output data measurement;
      where a carbon monoxide health impact score of the plurality of health impact scores may be based at least in part on the carbon monoxide output data measurement;
      where a nitrous dioxide health impact score of the plurality of health impact scores may be based at least in part on the nitrous dioxide output data measurement;
      where a sulfur dioxide health impact score of the plurality of health impact scores may be based at least in part on the sulfur dioxide output data measurement;
      where a tVOC health impact score of the plurality of health impact scores may be based at least in part on the tVOC output data measurement;
      where at least one particulate matter health impact score of the plurality of health impact scores may be based at least in part on the at least one particulate matter output data measurement;
   computing, by the processor, an overall health impact score in the at least one site location based at least in part on any of the plurality of health impact scores having a lowest health impact score;
   determining, by the processor, at least one verified environmental hazard type in the at least one site location when at least one particular health impact score of the plurality of health impact scores is less than a respective predefined threshold score that is unique to the at least one particular environmental parameter;
   generating, by the processor, by at least one machine learning model, at least one recommendation for remediating the at least one verified environmental hazard type when inputting the plurality of health impact scores into the at least one machine recommendation learning model;

transmitting, by the processor, over the communication network, at least one of:
(A) at least one first instruction to display on a computing device at least one of:
(i) the overall health impact score,
(ii) the at least one verified environmental hazard type, or
(iii) the at least one recommendation, or
(B) at least one second instruction to at least one environment-controlling equipment located at the at least one site location so as to change an operational parameter of the at least one environment-controlling equipment to mitigate the at least one verified environmental hazard type.

2. The method according to clause 1, where the computing device may be located inside the at least one site location.

3. The method according to clause 1, where the computing device may be located outside the at least one site location.

4. The method according to clause 1, where the at least one site location may include a room;
where the at least one environment-controlling equipment may include a computer-controlled actuator; and
wherein the transmitting of the at least one second instruction may trigger the computer-controlled actuator to automatically: increase or decrease outdoor air fraction in the room, disperse indoor air in the room, raise or lower a temperature of the room, raise or lower humidity in the room, activate or deactivate air cleaners in the room, or any combination thereof.

5. The method according to clause 1, where the at least one environment-controlling equipment may include at least one electronic circuitry in at least one communication device associated with at least one user; and
where the transmitting of the at least one second instruction may trigger the at least one electronic circuitry in the at least one communication device to alert the at least one user.

6. The method according to clause 1, where the at least one site location may include at least one room in a building;
where the at least one environment-controlling equipment may include electronic circuitry in a central computing device in the building; and
where the transmitting of the at least one second instruction may trigger the electronic circuitry in the central computing device in the building to generate an audible alarm, a visual alert, an electronic alert message, or any combination thereof.

7. The method according to clause 1, where the at least one site location may include at least one room in at least one building of an entity;
where the at least one environment-controlling equipment may include electronic circuitry in a central computing device at a predefined control-center location of the entity; and
where the transmitting of the at least one second instruction may trigger the electronic circuitry in the central computing device to generate an audible alarm, a visual alert, an electronic alert message, or any combination thereof.

8. The method according to clause 1, where the at least one site location may include at least one room in a building and an outside of the building;
where the at least one environment-controlling equipment may include electronic circuitry in a central computing device in the building, and
further including determining, by the processor, that the overall health impact score outside of the building is greater than the overall health impact score inside the at least one room; and causing, by the processor, over the communication network, to automatically open a window in the at least one room by the transmitting of the at least one second instruction to trigger a computer-controlled window actuator to automatically open the window.

9. The method according to clause 1, where the health impact scoring algorithm may be based at least in part on using a value from each of the plurality of environmental output data measurements and a square of the value.

10. The method according to clause 1, further including storing, by the processor, in a memory, the overall health impact score, the plurality of health impact scores, the at least one verified environmental hazard type, the at least one recommendation, or any combination thereof, that were measured at predefined time intervals.

11. The method according to clause 10, where the transmitting of the first instructions may cause the display to display a history of the overall health impact score, the plurality of health impact scores, the at least one verified environmental hazard type, the at least one recommendation, or any combination thereof, that were measured at the predefined time intervals.

12. The method according to clause 1, where the at least one particulate matter sensor may include a $PM_{10}$ particulate matter sensor, a $PM_{2.5}$ particulate matter sensor, and a $PM_1$ particulate matter sensor that respectively output a $PM_{2.5}$ particulate matter output data measurement, a $PM_{2.5}$ particulate matter output data measurement, and a $PM_1$ particulate matter output data measurement; and where the executing an health impact scoring algorithm to compute the at least one particulate matter health impact score is based at least in part on the $PM_{2.5}$ particulate matter output data measurement, the $PM_{2.5}$ particulate matter output data measurement, and the $PM_1$ particulate matter output data measurement.

13. A system may include a memory and a processor. The processor may be configured to execute computer code stored in the memory that causes the processor to:
receive over a communication network, from a plurality of environmental sensors, a plurality of environmental output data measurements of a plurality of environmental parameters;
where the plurality of environmental sensors may be located inside of at least one site location, outside of the at least one site location, or both;
where the plurality of environmental sensors may include:
(i) an ozone sensor, outputting an ozone output data measurement of the plurality of environmental output data measurements,
(ii) a humidity sensor, outputting a humidity output data measurement of the plurality of environmental output data measurements,
(iii) a temperature sensor, outputting a temperature output data measurement of the plurality of environmental output data measurements,
(iv) a carbon dioxide sensor, outputting a carbon dioxide output data measurement of the plurality of environmental output data measurements,
(v) a carbon monoxide sensor, outputting a carbon monoxide output data measurement of the plurality of environmental output data measurements,
(vi) a nitrous dioxide sensor, outputting a nitrous dioxide output data measurement of the plurality of environmental output data measurements,
(vii) a sulfur dioxide sensor, outputting a sulfur dioxide output data measurement of the plurality of environmental output data measurements, (viii) a total volatile organic compound (tVOC) sensor, outputting a tVOC output data measurement of the plurality of environmental output data measurements, and (ix) at least one particulate matter sensor, outputting at least one particulate matter output data measurement of the plurality of environmental output data measurements;

execute a health impact scoring algorithm software to compute a plurality of health impact scores based at least in part on the plurality of environmental output data measurements from the plurality of environmental sensors;

where a humidity health impact score of the plurality of health impact scores may be based at least in part on the humidity output data measurement;

where an ozone health impact score of the plurality of health impact scores may be based at least in part on the ozone output data measurement;

where a temperature health impact score of the plurality of health impact scores may be based at least in part on the temperature output data measurement;

where a carbon dioxide health impact score of the plurality of health impact scores may be based at least in part on the carbon dioxide output data measurement;

where a carbon monoxide health impact score of the plurality of health impact scores may be based at least in part on the carbon monoxide output data measurement;

where a nitrous dioxide health impact score of the plurality of health impact scores may be based at least in part on the nitrous dioxide output data measurement;

where a sulfur dioxide health impact score of the plurality of health impact scores may be based at least in part on the sulfur dioxide output data measurement;

where a tVOC health impact score of the plurality of health impact scores may be based at least in part on the tVOC output data measurement;

where at least one particulate matter health impact score of the plurality of health impact scores may be based at least in part on the at least one particulate matter output data measurement;

compute an overall health impact score in the at least one site location based at least in part on any of the plurality of health impact scores having a lowest health impact score;

determine at least one verified environmental hazard type in the at least one site location when at least one particular health impact score of the plurality of health impact scores is less than a respective predefined threshold score that is unique to the at least one particular environmental parameter;

generate by at least one machine learning model, at least one recommendation for remediating the at least one verified environmental hazard type when inputting the plurality of health impact scores into the at least one machine learning model;

transmit over the communication network, at least one of:
(A) at least one first instruction to display on a computing device at least one of:
(i) the overall health impact score,
(ii) the at least one verified environmental hazard type, or
(iii) the at least one recommendation, or
(B) at least one second instruction to at least one environment-controlling equipment located at the at least one site location so as to change an operational parameter of the at least one environment-controlling equipment to mitigate the at least one verified environmental hazard type.

14. The system according to clause 13, where the computing device may be located inside the at least one site location.

15. The system according to clause 13, where the computing device may be located outside the at least one site location.

16. The system according to clause 13, where the at least one site location may include a room;
where the at least one environment-controlling equipment may include a computer-controlled actuator; and
wherein the processor may be configured to transmit the at least one second instruction that triggers the computer-controlled actuator to automatically: increase or decrease outdoor air fraction in the room, disperse indoor air in the room, raise or lower a temperature of the room, raise or lower humidity in the room, activate or deactivate air cleaners in the room, or any combination thereof.

17. The system according to clause 13, where the at least one environment-controlling equipment may include at least one electronic circuitry in at least one communication device associated with at least one user; and
where the processor may be configured to transmit the at least one second instruction that triggers the at least one electronic circuitry in the at least one communication device to alert the at least one user.

18. The system according to clause 13, where the at least one site location may include at least one room in a building;
where the at least one environment-controlling equipment may include electronic circuitry in a central computing device in the building; and
where the processor may be configured to transmit the at least one second instruction that triggers the electronic circuitry in the central computing device in the building to generate an audible alarm, a visual alert, an electronic alert message, or any combination thereof.

19. The system according to clause 13, where the at least one site location may include at least one room in at least one building of an entity;
where the at least one environment-controlling equipment may include electronic circuitry in a central computing device at a predefined control-center location of the entity; and
where the processor may be configured to transmit the at least one second instruction that triggers the electronic circuitry in the central computing device to generate an audible alarm, a visual alert, an electronic alert message, or any combination thereof.

20. The system according to clause 13, where the at least one site location may include at least one room in a building and an outside of the building;
where the at least one environment-controlling equipment may include electronic circuitry in a central computing device in the building, and
where the processor may be further configured to determine that the overall health impact score outside of the building is greater than the overall health impact score inside the at least one room, and
to cause over the communication network, to automatically open a window in the at least one room by the transmitting of the at least one second instruction to trigger a computer-controlled window actuator to automatically open the window.

21. The system according to clause 13, where the health impact scoring algorithm may be based at least in part on using a value from each of the plurality of environmental output data measurements and a square of the value.

22. The system according to clause 13, where the processor may be further configured to store in the memory: the overall health impact score, the plurality of health impact scores, the at least one verified environmental hazard type, the at least one recommendation, or any combination thereof, that were measured at predefined time intervals.

23. The system according to clause 22, where the processor may be configured to transmit the first instructions that causes the display to display a history of the overall health impact score, the plurality of health impact scores, the at least one verified environmental hazard type, the at least one recommendation, or any combination thereof, that were measured at the predefined time intervals.

24. The system according to clause 13, where the at least one particulate matter sensor may include a $PM_{10}$ particulate matter sensor, a $PM_{2.5}$ particulate matter sensor, and a $PM_1$ particulate matter sensor that respectively output a $PM_{2.5}$ particulate matter output data measurement, a $PM_{2.5}$ particulate matter output data measurement, and a $PM_1$ particulate matter output data measurement; and where the processor may be configured to execute an health impact scoring algorithm that computes the at least one particulate matter health impact score based at least in part on the $PM_{2.5}$ particulate matter output data measurement, the $PM_{2.5}$ particulate matter output data measurement, and the $PM_1$ particulate matter output data measurement.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
continuously receiving, by a processor, over a communication network, from a plurality of environmental sensors, a plurality of environmental output data measurements of a plurality of environmental parameters;
wherein the plurality of environmental parameters comprises:
(i) an ozone parameter,
(ii) a humidity parameter,
(iii) a temperature parameter,
(iv) a carbon dioxide parameter,
(v) a carbon monoxide parameter,
(vi) a nitrous dioxide parameter,
(vii) a sulfur dioxide parameter,
(viii) a total volatile organic compound (tVOC) parameter, and
(ix) a particulate matter parameter;
wherein the plurality of environmental sensors is located inside of a building, outside of the building, or both;
wherein each particular sensor of the plurality of environmental sensors is configured to continuously output a particular environmental output data measurement for a particular environmental parameter of the plurality of environmental parameters to obtain a plurality of environmental output data measurements;
automatically determining, by the processor, a particular health impact score for each particular environmental parameter of the plurality of environmental parameters based on the particular environmental output data measurement for the particular environmental parameter and at least one other environmental output data measurement from the plurality of environmental output data measurements to obtain a plurality of health impact scores associated with the plurality of environmental parameters;
wherein each health impact score of the plurality of health impact scores is associated with a particular health impact on at least one occupant in the building;
automatically optimizing, by the processor, an indoor environment for a health of at least one occupant of the building, by:
defining, by the processor, a particular overall health impact score to each particular lowest health impact score from the plurality of health impact scores when each particular lowest health impact score, associated with the particular environmental parameter from the plurality of environmental parameters, is less than a particular predefined threshold score that is unique to the particular environmental parameter;
determining, by the processor, a particular verified environmental hazard type associated with each particular lowest health impact score;
utilizing, by the processor, at least one machine learning model to generate each particular recommendation for remediating each particular verified environmental hazard type based on inputting the plurality of health impact scores into the at least one machine learning model;
transmitting, by the processor, over the communication network, at least one of:
(A) at least one first instruction to display on a computing device at least one of:
(i) each particular overall health impact score,
(ii) each particular verified environmental hazard type, and
(iii) each particular recommendation, or
(B) at least one second instruction to at least one environment-controlling equipment associated with the building so as to change an operational parameter of the at least one environment-controlling equipment to mitigate each particular verified environmental hazard type; and
confirming, by the processor, each health impact score from the plurality of health impact scores is equal to or above each particular predefined threshold score after each particular recommendation has been implemented.

2. The method according to claim 1, wherein the computing device is located inside the building.

3. The method according to claim 1, wherein the computing device is located outside the building.

4. The method according to claim 1, wherein the building comprises a room;
wherein the at least one environment-controlling equipment comprises a computer-controlled actuator; and
wherein the transmitting of the at least one second instruction triggers the computer-controlled actuator to automatically: increase or decrease outdoor air fraction in the room, disperse indoor air in the room, raise or lower a temperature of the room, raise or lower humidity in the room, activate or deactivate air cleaners in the room, or any combination thereof.

5. The method according to claim 1, wherein the at least one environment-controlling equipment comprises at least one electronic circuitry in at least one communication device associated with at least one user; and wherein the transmitting of the at least one second instruction triggers the at least one electronic circuitry in the at least one communication device to alert the at least one user.

6. The method according to claim 1,
wherein the at least one environment-controlling equipment comprises electronic circuitry in a central computing device in the building; and
wherein the transmitting of the at least one second instruction triggers the electronic circuitry in the central computing device in the building to generate an audible alarm, a visual alert, an electronic alert message, or any combination thereof.

7. The method according to claim 1,
wherein the at least one environment-controlling equipment comprises electronic circuitry in a central computing device at a predefined control-center location of an entity; and
wherein the transmitting of the at least one second instruction triggers the electronic circuitry in the central computing device to generate an audible alarm, a visual alert, an electronic alert message, or any combination thereof.

8. The method according to claim 1, wherein the building comprises at least one room;
wherein the at least one environment-controlling equipment comprises electronic circuitry in a central computing device in the building, and
further comprising determining, by the processor, that the particular overall health impact score outside of the building is greater than the particular overall health impact score inside the at least one room; and
causing, by the processor, over the communication network, to automatically open a window in the at least one room by the transmitting of the at least one second instruction to trigger a computer-controlled window actuator to automatically open the window.

9. The method according to claim 1, wherein the particular health impact score is based at least in part on using a value of the particular environmental output data measurement for the particular environmental parameter and a square of the value.

10. The method according to claim 1, further comprising storing, by the processor, in a memory, each particular overall health impact score, each particular verified environmental hazard type, each particular recommendation, or any combination thereof, that were measured at predefined time intervals.

11. The method according to claim 10, wherein the transmitting of the at least one first instructions causes the computing device to display a history of each particular overall health impact score, each particular verified environmental hazard type, each particular recommendation, or any combination thereof, that were measured at the predefined time intervals.

12. The method according to claim 1, wherein the particulate matter parameter comprises a $PM_{10}$ particulate matter parameter, a $PM_{2.5}$ particulate matter parameter, and a $PM_1$ particulate matter parameter and wherein the automatic determining of the particular health impact score is based at least in part on a $PM_{10}$ particulate matter output data measurement for the $PM_{10}$ particulate matter parameter, a $PM_{2.5}$ particulate matter output data measurement for the $PM_{2.5}$ particulate matter parameter, and a $PM_1$ particulate matter output data measurement for the $PM_1$ particulate matter parameter.

13. A system, comprising:
a memory; and
a processor configured to execute computer code stored in the memory that causes the processor to:
continuously receive over a communication network, from a plurality of environmental sensors, a plurality of environmental output data measurements of a plurality of environmental parameters;
wherein the plurality of environmental parameters comprises:
(i) an ozone parameter,
(ii) a humidity parameter,
(iii) a temperature parameter,
(iv) a carbon dioxide parameter,
(v) a carbon monoxide parameter,
(vi) a nitrous dioxide parameter,
(vii) a sulfur dioxide parameter,
(viii) a total volatile organic compound (tVOC) parameter, and
(ix) a particulate matter parameter;
wherein the plurality of environmental sensors is located inside of a building, outside of the building, or both;
wherein each particular sensor of the plurality of environmental sensors is configured to continuously output a particular environmental output data measurement for a particular environmental parameter of the plurality of environmental parameters to obtain a plurality of environmental output data measurements;
automatically determine a particular health impact score for each particular environmental parameter of the plurality of environmental parameters based on the particular environmental output data measurement for the particular environmental parameter and at least one other environmental output data measurement from the plurality of environmental output data measurements to obtain a plurality of health impact scores associated with the plurality of environmental parameters;
automatically optimize an indoor environment for a health of at least one occupant of the building, by further configuring the processor to:
define a particular overall health impact score to each particular lowest health impact score from the plurality of health impact scores when each particular lowest health impact score, associated with the particular environmental parameter from the plurality of environmental parameters, is less than a particular predefined threshold score that is unique to the particular environmental parameter;
determine a particular verified environmental hazard type associated with each particular lowest health impact score;
utilize at least one machine learning model to generate each particular recommendation for remediating each particular verified environmental hazard type based on inputting the plurality of health impact scores into the at least one machine learning model;
transmit over the communication network, at least one of:
(A) at least one first instruction to display on a computing device at least one of:
(i) each particular overall health impact score, (ii) each particular verified environmental hazard type, and
(iii) each particular recommendation, or
(B) at least one second instruction to at least one environment-controlling equipment associated with the building so as to change an operational parameter of the at least one environment-controlling equipment to mitigate each particular verified environmental hazard type; and confirm each health impact score from the plurality of health impact scores is equal to or above each particular predefined threshold score after each particular recommendation has been implemented.

14. The system according to claim 13, wherein the computing device is located inside the building.

15. The system according to claim 13, wherein the computing device is located outside the building.

16. The system according to claim 13, wherein the building comprises a room;
wherein the at least one environment-controlling equipment comprises a computer-controlled actuator; and
wherein the processor is configured to transmit the at least one second instruction that triggers the computer-controlled actuator to automatically: increase or decrease outdoor air fraction in the room, disperse indoor air in the room, raise or lower a temperature of the room, raise or lower humidity in the room, activate or deactivate air cleaners in the room, or any combination thereof.

17. The system according to claim 13, wherein the at least one environment-controlling equipment comprises at least one electronic circuitry in at least one communication device associated with at least one user; and
wherein the processor is configured to transmit the at least one second instruction that triggers the at least one electronic circuitry in the at least one communication device to alert the at least one user.

18. The system according to claim 13,
wherein the at least one environment-controlling equipment comprises electronic circuitry in a central computing device in the building; and
wherein the processor is configured to transmit the at least one second instruction that triggers the electronic circuitry in the central computing device in the building to generate an audible alarm, a visual alert, an electronic alert message, or any combination thereof.

19. The system according to claim 13,
wherein the at least one environment-controlling equipment comprises electronic circuitry in a central computing device at a predefined control-center location of an entity; and
wherein the processor is configured to transmit the at least one second instruction that triggers the electronic circuitry in the central computing device to generate an audible alarm, a visual alert, an electronic alert message, or any combination thereof.

20. The system according to claim 13, wherein the building comprises at least one room;
wherein the at least one environment-controlling equipment comprises electronic circuitry in a central computing device in the building, and
wherein the processor is further configured to determine that the particular overall health impact score outside of the building is greater than the particular overall health impact score inside the at least one room, and
to cause over the communication network, to automatically open a window in the at least one room by the transmitting of the at least one second instruction to trigger a computer-controlled window actuator to automatically open the window.

21. The system according to claim 13, wherein the particular health impact score is based at least in part on using a value of the particular environmental output data measurement for the particular environmental parameter and a square of the value.

22. The system according to claim 13, wherein the processor is further configured to store in the memory: each particular overall health impact score, each particular verified environmental hazard type, each particular recommendation, or any combination thereof, that were measured at predefined time intervals.

23. The system according to claim 22, wherein the processor is configured to transmit the at least one first instructions that causes the computing device to display a history of each particular overall health impact score, each particular verified environmental hazard type, each particular recommendation, or any combination thereof, that were measured at the predefined time intervals.

24. The system according to claim 13, wherein the particulate matter parameter comprises a $PM_{10}$ particulate matter parameter, a $PM_{2.5}$ particulate matter parameter, and a $PM_1$ particulate matter parameter and wherein the processor is configured to automatically determine the particular an health impact score based at least in part on a $PM_{10}$ particulate matter output data measurement for the $PM_{10}$ particulate matter parameter, a $PM_{2.5}$ particulate matter output data measurement for the $PM_{2.5}$ particulate matter parameter, and a $PM_1$ particulate matter output data measurement for the $PM_1$ particulate matter parameter.

\* \* \* \* \*